(12) United States Patent
Fujita et al.

(10) Patent No.: US 7,185,915 B2
(45) Date of Patent: Mar. 6, 2007

(54) STEERING WHEEL INCORPORATING AIR BAG DEVICE

(75) Inventors: Yoshiyuki Fujita, Aichi-ken (JP); Keisuke Imai, Kani (JP); Masanori Yajima, Obu (JP); Toshihiro Kimura, Obu (JP); Masao Okumura, Obu (JP); Youji Hamamoto, Obu (JP)

(73) Assignees: Toyoda Gosei Co., Ltd., Aichi-ken (JP); Matsuo Industries Inc., Aichi-ken (JP)

( * ) Notice: Subject to any disclaimer, the term of this patent is extended or adjusted under 35 U.S.C. 154(b) by 401 days.

(21) Appl. No.: 10/784,289

(22) Filed: Feb. 24, 2004

(65) Prior Publication Data

US 2004/0169358 A1 Sep. 2, 2004

(30) Foreign Application Priority Data

Feb. 27, 2003 (JP) ............................. 2003-051861
Jul. 25, 2003 (JP) ............................. 2003-280448

(51) Int. Cl.
B60R 21/203 (2006.01)

(52) U.S. Cl. .................................................... 280/731
(58) Field of Classification Search ................ 280/731, 280/728.2; 74/552
See application file for complete search history.

(56) References Cited

U.S. PATENT DOCUMENTS

| | | | | |
|---|---|---|---|---|
| 5,046,757 A | * | 9/1991 | Sadler et al. ................ | 280/731 |
| 5,244,230 A | * | 9/1993 | Komiya et al. | |
| 5,333,897 A | * | 8/1994 | Landis et al. ............ | 280/728.2 |
| 5,380,037 A | * | 1/1995 | Worrell et al. ............ | 280/728.2 |
| 5,692,770 A | * | 12/1997 | Scharboneau et al. | |
| 6,036,223 A | * | 3/2000 | Worrell et al. | |
| 6,149,188 A | * | 11/2000 | Simpson et al. ............. | 280/731 |
| 6,196,573 B1 | * | 3/2001 | Worrell et al. | |
| 6,237,944 B1 | * | 5/2001 | Worrell et al. ............... | 280/731 |
| 6,474,682 B2 | * | 11/2002 | Ikeda et al. | |
| 6,565,113 B2 | * | 5/2003 | Kassman et al. ........ | 280/728.2 |
| 6,688,638 B2 | * | 2/2004 | Schutz | |
| 6,719,324 B2 | * | 4/2004 | Albers et al. | |
| 6,783,150 B2 | * | 8/2004 | Ahlquist | |
| 6,793,237 B2 | * | 9/2004 | Derrick et al. ........... | 280/728.2 |
| 6,827,367 B1 | * | 12/2004 | Frisch ..................... | 280/728.2 |
| 6,846,011 B2 | * | 1/2005 | Schutz et al. ................ | 280/731 |
| 6,871,870 B2 | * | 3/2005 | Schneider et al. ....... | 280/728.2 |
| 6,874,808 B2 | * | 4/2005 | Marath et al. | |
| 6,877,770 B2 | * | 4/2005 | Paonessa ..................... | 280/731 |
| 7,059,631 B2 | * | 6/2006 | Schorle et al. .............. | 280/731 |
| 2002/0043786 A1 | * | 4/2002 | Schutz ..................... | 280/728.2 |
| 2002/0068369 A1 | * | 6/2002 | Scherer et al. | |
| 2003/0173759 A1 | * | 9/2003 | Grenier | |
| 2003/0184062 A1 | * | 10/2003 | Albers et al. | |
| 2004/0004344 A1 | * | 1/2004 | Kim et al. | |
| 2005/0087962 A1 | * | 4/2005 | Burgard et al. .......... | 280/728.2 |

FOREIGN PATENT DOCUMENTS

JP A-2001-163146 6/2001

* cited by examiner

*Primary Examiner*—David R. Dunn
*Assistant Examiner*—Leonard McCreary, Jr.
(74) *Attorney, Agent, or Firm*—Posz Law Group, PLC

(57) ABSTRACT

A steering wheel incorporating an air bag device that facilitates the attachment and removal of an air bag module with respect to a steering wheel body while reducing manufacturing costs. The steering wheel body has a spoke core, which includes a hook. A horn plate, which forms part of the air bag module, includes a catch that is flexed to engage the hook.

16 Claims, 15 Drawing Sheets

STEERING WHEEL INCORPORATING AIR BAG DEVICE

BACKGROUND OF THE INVENTION

The present invention relates to a steering wheel for a vehicle, and more particularly, to a steering wheel incorporating an air bag device for protecting an occupant sitting in the driver's seat of the vehicle.

Japanese Laid-Open Patent Publication No. 2001-163146 describes a prior art steering wheel that enables an air bag module to be attached to a steering wheel body with a single action. Referring to FIGS. 20A and 20B, in the prior art steering wheel, an air bag module 100 includes a retainer 101 provided with a catch 102. A fastening end 111 of a pin 110, which is arranged on a metal core (not shown), is engaged with the catch 102 to connect the air bag module 100 to the steering wheel body.

The catch 102 includes an outer plate 103, an inner plate 104, and a coil spring 105. Thus, the catch 102 increases the number of components and assembling steps of the steering wheel. Further, the metal core must be machined with high accuracy to accurately attach the pin 110 to the metal core. Thus, the steering wheel has a high manufacturing cost.

To disengage the catch 102 from the pin 110, the inner plate 104 must be moved against the urging force of the coil spring 105 to separate the air bag module 100 from the metal core. This is burdensome and time-consuming.

SUMMARY OF THE INVENTION

It is an object of the present invention to provide a steering wheel incorporating an air bag device that reduces manufacturing costs while enabling the air bag module to be easily attached to and removed from the steering wheel body.

To achieve the above object, the present invention provides a steering wheel for incorporating an air bag device. The steering wheel has a steering wheel body including a core. An air bag module is attached to the steering wheel body. A metal plate is arranged in the air bag module facing towards the core. A first engaging portion is arranged on one of the core and the metal plate. A second engaging portion is arranged on the other one of the core and the metal plate to resiliently engage the first engaging portion.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A steering wheel 1 according to a first embodiment of the present invention will now be discussed with reference to FIGS. 1 and 4.

Figure 1:
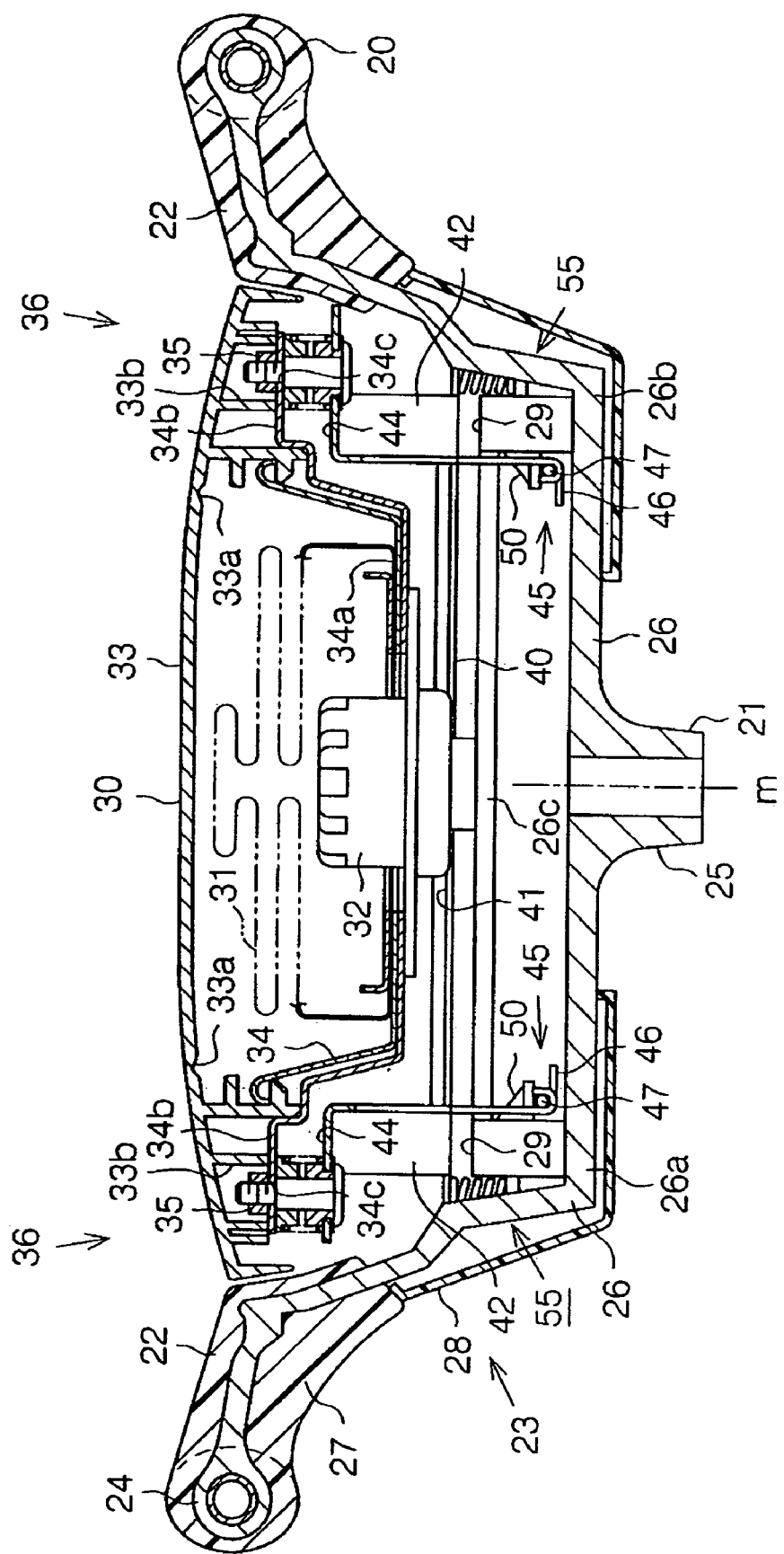
FIG. 1 is a cross-sectional view showing a steering wheel according to a first embodiment of the present invention.

As shown in FIG. 1, the steering wheel 1 includes a steering wheel body 23 and an air bag module 30. The steering wheel body 23 includes an annular rim 20, a boss 21 located in the center of the rim 20, and three spokes 22 (only two shown in FIG. 1) connecting the rim 20 and the boss 21. The air bag module 30 is arranged above the boss 21.

Further, the steering wheel body 23 includes a rim core 24 corresponding to the rim 20, a boss core 25 corresponding to the boss 21, and spoke cores 26 corresponding to the spokes 22. It is preferred that the cores 24 to 26 be die-cast integrally.

A cover layer 27, which is formed from a resin material, such as a polyurethane, is formed on the rim core 24 and part of the spoke cores 26. A lower cover 28 covers the portions of the spoke cores 26 that are not covered by the cover layer 27 and part of the boss core 25. Fasteners, such as a screws, fastens the lower cover 28 to the boss core 25. The boss core 25 is connected to a steering shaft (not shown) so that the rotation of the steering wheel 1 is conveyed to the steering shaft.

Figure 2:
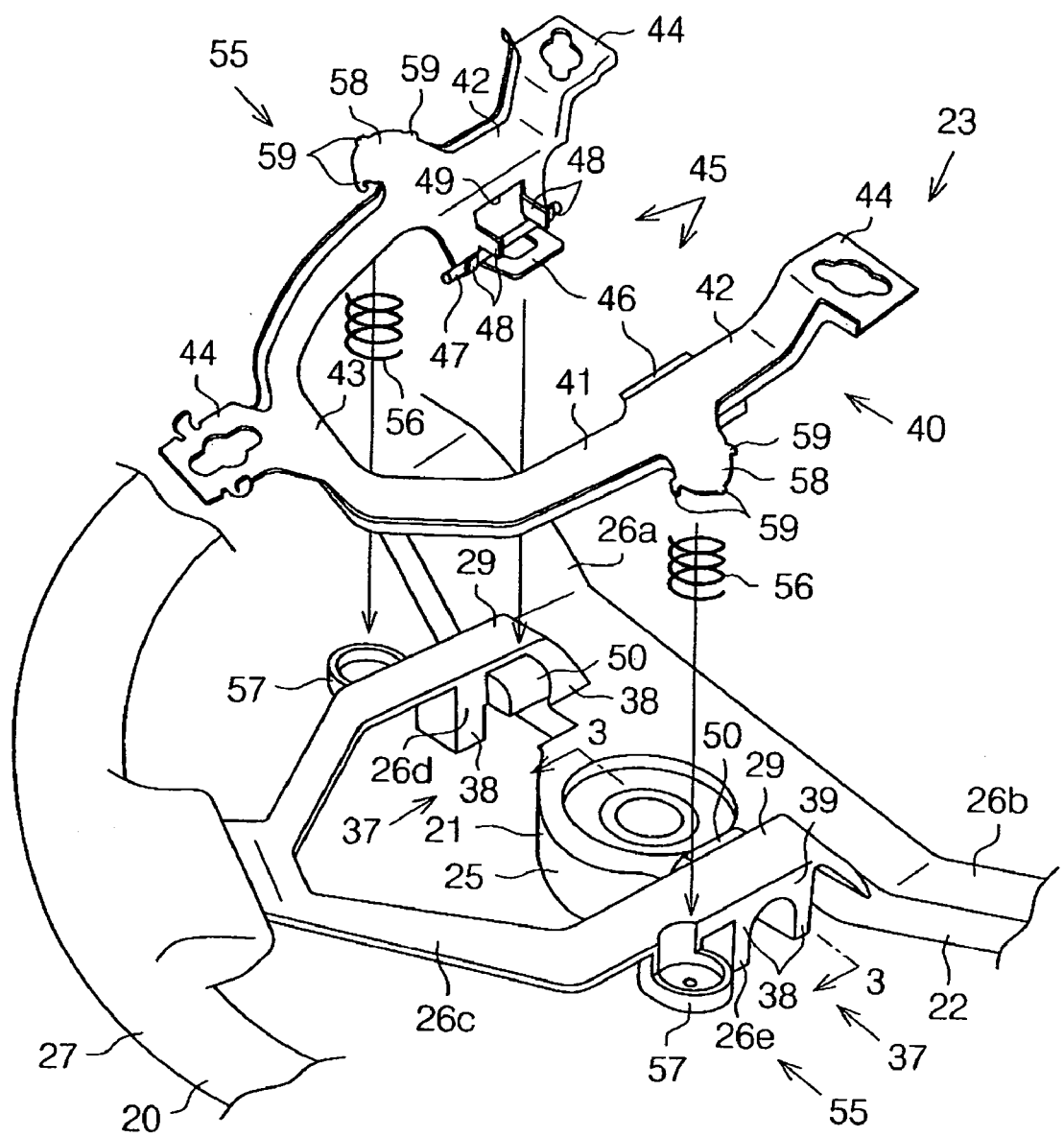
FIG. 2 is an exploded perspective view showing a steering wheel body and a horn plate.

As viewed in FIG. 1, a first spoke core 26a and a second spoke core 26b, which are connected to the rim core 24, extend continuously in a linear manner by way of the boss core 25. Referring to FIG. 2, a third spoke core 26c extends perpendicular to the direction in which the first and second spoke cores 26a and 26b extend. The third spoke core 26c, which is generally Y-like, includes one end connected to the rim core 24 and two bifurcated inner ends respectively connected to the first spoke core 26a and the second spoke core 26b.

Each of the two inner ends of the third spoke core 26c includes a bendable portion 29. The bendable portions 29 are bent when an external force, which may be produced by a change in the posture of the driver, is applied to the portion where the third spoke core 26c is connected to the rim 20 (rim core 24). The bending of the bendable portions 29 enables the rim 20 to be displaced.

The air bag module 30 includes an inflatable air bag 31, which is folded as shown in the state of FIG. 1, an inflator 32 for supplying the air bag 31 with gas, a pad 33 covering the folded air bag 31, and a bag holder 34 for holding the air bag 31, the inflator 32, and the pad 33. A plurality of bolts (not shown) fasten the air bag 31, the inflator 32, and the bag holder 34 to one another.

The pad is a resin molded product. A tear line 33a, which, for example, is H-like, is formed in the central portion of the rear side of the pad 33. The inflation of the air bag 31 tears the pad 33 along the tear line 33a. A plurality of ribs 33b are formed near the peripheral portion of the rear side of the pad 33.

The bag holder 34 is formed from a thin metal plate. The bag holder 34 includes a bottom portion 34a, to which the inflator 32 is fastened, and extended portions 34b, which extend towards the ribs 33b from the bottom portion 34a. Each extended portion 34b has a nut 35 welded thereto near the ribs 33b and a hole 34c with a diameter substantially the same as the inner diameter of the threaded portion in the nut 35. The bag holder 34 is connected to a metal horn plate (bracket) 40 by way of a horn switch mechanism 36, which is formed integrally with the extended portions 34b. The structure of the horn switch mechanism 36 is well known and will not be described here.

Referring to FIG. 2, the horn plate 40 is generally U-like and formed from a thin plate. The horn plate 40 is arranged facing towards the third spoke core 26c and substantially overlapping the two bifurcated portions of the third spoke core 26c.

The horn plate 40 includes a generally U-shaped frame 41, which has two end portions 42 and a curved portion 43 that lie along the same plane, and three supports 44, which extend upward from the end portions 42 and the curved portion 43. The horn switch mechanism 36 is attached to the three supports 44. The horn plate 40 is engaged with the third spoke core 26c to attach the air bag module 30 to the steering wheel body 23.

As shown in FIG. 2, a pair of hooks 50 extend toward the boss core 25 from an inner surface 26d of the third spoke core 26c near the portions where the third spoke core 26c is connected to the first and second spoke cores 26a and 26b.

Figure 3:
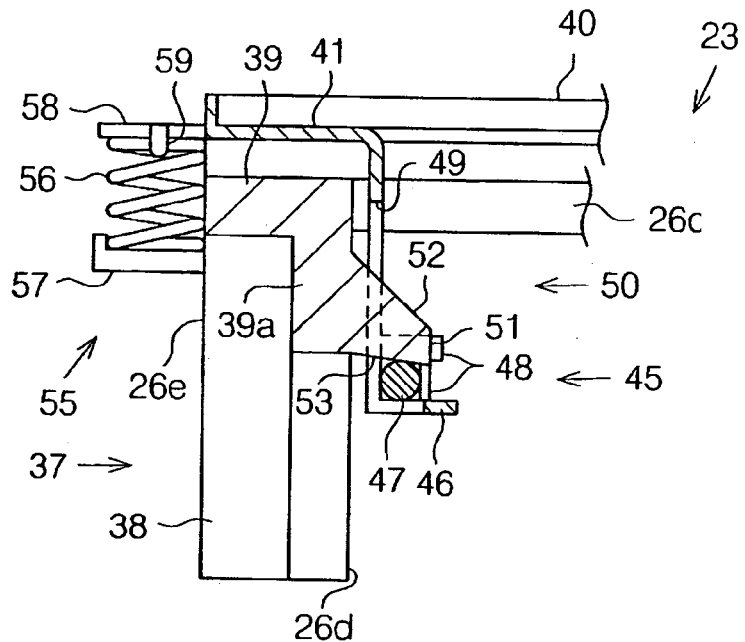
FIG. 3 is a cross-sectional view taken along line 3—3 in FIG. 2.

As shown in FIG. 3, each hook 50 is trapezoidal and includes a distal surface 51, which is parallel to the associated inner surface 26d of the third spoke core 26c, an inclined surface (upper surface) 52, which is inclined toward the distal surface 51, and a lower surface 53, which is generally perpendicular to the associated inner surface 26d of the third spoke core 26c.

The third spoke core 26c includes reinforcements 37, which increase rigidity of the hooks 50 and the vicinity thereof. Each reinforcement 37 includes a pair of projections 38 projecting downward from the lower surface of the third spoke core 26c at opposite sides of each hook 50. The projections 38 are connected to each other by an arcuate bridge 39 near the associated end of the third spoke core 26c.

As shown in FIG. 3, the bridge 39 has an extension piece 39a extending downward from between the projections 38. The hook 50 is formed continuously with the extension piece 39a. Instead of the projections 38, the portions of the third spoke core 26c near the hooks 50 may be thickened to increase rigidity in the third spoke core 26c at each hook 50 and the vicinity thereof.

Referring to FIGS. 1 to 3, the horn plate 40 includes catches 45, each of which is resiliently engaged with one of the hooks 50 of the third spoke core 26c when attaching the air bag module 30 to the steering wheel body 23. In the first embodiment, each hook 50 serves as a first engaging portion and each catch 45 serves as a second engaging portions.

Each catch 45 is arranged at a position corresponding to the associated hook 50. The catch 45 includes a spring support 46 and a bar spring (resilient member) 47. The catch 45 extends downward from the frame 41 at a substantially right angle with respect to the frame 41 and is then bent at a substantially right angle to form the spring support 46, which is parallel to the frame 41. The bar spring 47 is fixed to the spring support 46. The spring support 46 has a distal end facing towards the boss core 25. The bar spring 47 is held by a plurality of bent pieces 48, which are formed by bending parts of the spring support 46. This enables resilient flexing of the bar spring 47 but restricts movement of the bar spring 47 toward the center of the horn plate 40. The spring support 46 has an opening 49 for receiving the associated hook 50.

The steering wheel 1 includes stabilizing mechanisms 55 for preventing the air bag module 30 from chattering on the steering wheel body 23 to stably hold the air bag module 30 on the steering wheel body 23. Referring to FIGS. 2 and 3, each stabilizing mechanism 55 includes urging members, or compression coil springs 56, for urging the horn plate 40 away from the third spoke core 26c. Other elastic urging members, such as rubber blocks, may be used in lieu of the coil springs 56. The lower end of each coil spring 56 is supported by a lower seat 57, which extends from the outer surface 26e of the third spoke core 26c near the associated hook 50, and the upper end of the coil spring 56 is supported by an upper seat 58, which extends outward from the frame 41 of the horn plate 40 at a position corresponding to the lower seat 57. A plurality of (three in the first embodiment) claws 59 extend from each upper seat 58 to hold the upper end of the associated coil spring 56.

To attach the air bag module 30 to the steering wheel body 23, the air bag module 30 is first arranged near the third spoke core 26c so that the bar springs 47 of the catches 45 come into contact with the inclined surfaces 52 of the associated hooks 50. In this state, pressure is applied to the air bag module 30 toward the third spoke core 26c. This resiliently flexes the middle portion of each bar spring 47 toward the boss core 25 as the bar spring 47 moves along the associated hook 50 while in contact with the inclined surface 52 and distal surface 51. Further pressure is applied to the air bag module 30 so that each bar spring 47 moves past the distal surface 51 of the associated hook 50 and returns to its original form. In this state, the bar spring 47 is held under the lower surface 53 of the hook 50 at a holding position, which is closer to the inner surface 26d of the spoke core 26c than the distal surface 51.

Further, in this state, the lower seats 57 of the third spoke core 26c supports the coil springs 56 of the associated stabilizing mechanisms 55. Thus, when the application of pressure to the air bag module 30 is stopped, the air bag module 30 (horn plate 40) is urged away from the third spoke core 26c. The urging force of the coil springs 56 abuts the bar springs 47 of the catches 45 against the lower surfaces of the hooks 50 and stably holds the air bag module 30 with respect to the steering wheel body 23.

To remove the air bag module 30 from the steering wheel body 23, the middle of each bar spring 47 is forced toward the boss core 25 with a tool, such as a driver, to elastically flex the bar spring 47. When the middle of each bar spring 47 reaches a release position, which is closer to the boss core 25 than the distal surface 51 of the associated hook 50, the coil springs 56 move the bar spring 47 upward and away from the third spoke core 26c. Thus, the bar spring 47 comes into contact with the distal surface 51 of the hook 50. In this state, the air bag module 30 is moved upward to release the bar springs 47 from the hooks 50 and remove the air bag module 30.

Figure 4A:
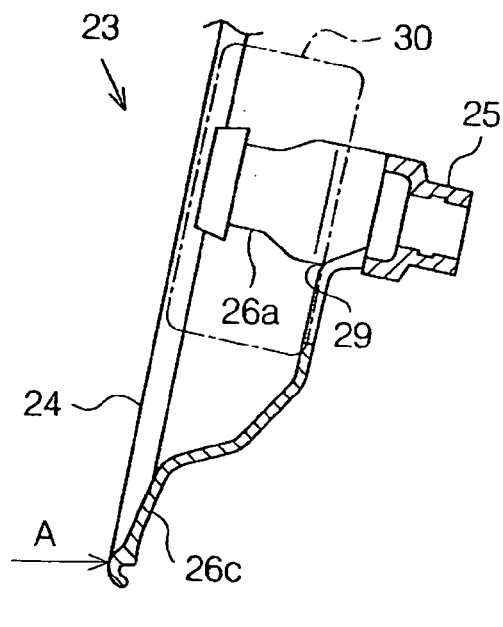
FIG. 4A is a partial cross-sectional view showing a rim core prior to displacement.
Figure 4B:
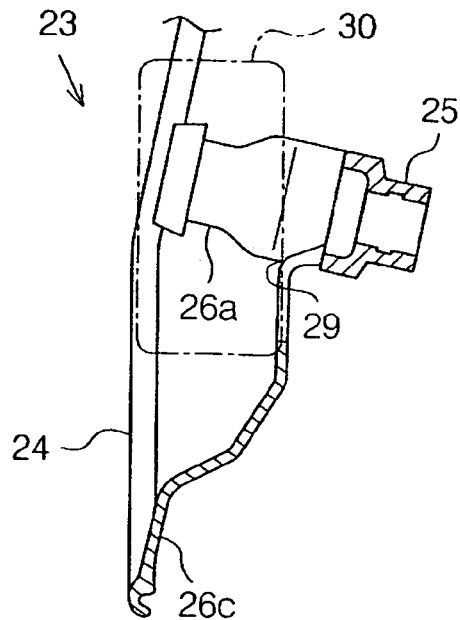
FIG. 4B is a partial cross-sectional view showing a rim core subsequent to displacement.

Referring to FIG. 4A, an external force, which may be produced by a change in the posture of the driver, may apply a large load acting in the direction indicated by arrow A to the portion where the third spoke core 26c is connected to the rim 20 (rim core 24) of the steering wheel 1. In such a case, referring to FIG. 4B, the bendable portions 29 of the third spoke core 26c are bent and the rim core 24 is displaced. This displaces the air bag module 30 in accordance with the bending of the third spoke core 26c to adjust the inflation direction of the air bag 31 so that the air bag 31 is inflated toward the driver.

The first embodiment has the advantages described below.

(1) The third spoke core 26c includes the hooks 50, and the horn plate 40 includes the catches 45 (bar springs 47), which are engaged with the hooks 50. This enables the air bag module 30 to be attached to the steering wheel body 23 just by arranging the air bag module 30 near the steering wheel body 23 and resiliently flexing the bar springs 47 of the horn plate 40 to engage the bar springs 47 with the hooks 50 of the third spoke core 26c. Accordingly, the air bag module 30 is easily attached to the steering wheel body 23 in a single action.

Further, the air bag module is easily removed from the steering wheel body 23 by resiliently flexing each bar spring 47 to arrange the bar spring 47 at a position where it may be released from the associated hook 50 (release position). Accordingly, the air bag module 30 is easily removed from the steering wheel body 23.

The hooks 50 are formed when the third spoke core 26c is die-cast. Thus, there is no need for separate components that are engaged with the bar springs 47 of the air bag module 30. This decreases the number of components of the steering wheel 1.

The hooks 50 are formed on the third spoke core 26c. Thus, in comparison with when hooks are formed on the air bag module 30 or when catches are formed on the third spoke core 26c, the structure of the third spoke core 26c is simplified. This simplifies the structure of the mold that is used when the third spoke core 26c is die-cast. Further, the hooks 50 are formed without performing high accuracy machining. Thus, the metal core is formed easily and inexpensively. In addition, the bent pieces 48, which hold the bar springs 47, are easily formed by bending the horn plate 40. This reduces the manufacturing cost of the steering wheel 1.

(2) The stabilizing mechanisms 55 prevent the air bag module 30 from chattering on the steering wheel body 23 when the vehicle is moving. This improves the quality of the steering wheel 1.

(3) The coil springs 56 urge the horn plate 40 away from the third spoke core 26c. Thus, the air bag module 30 is stably held with a simple structure.

(4) The hooks 50 are arranged closer to the rim core 24 than the bendable portions 29 of the third spoke core 26c. The bending of the third spoke core 26c displaces the air bag module 30 so that the air bag 31 is inflated optimally toward the driver.

Figure 5:
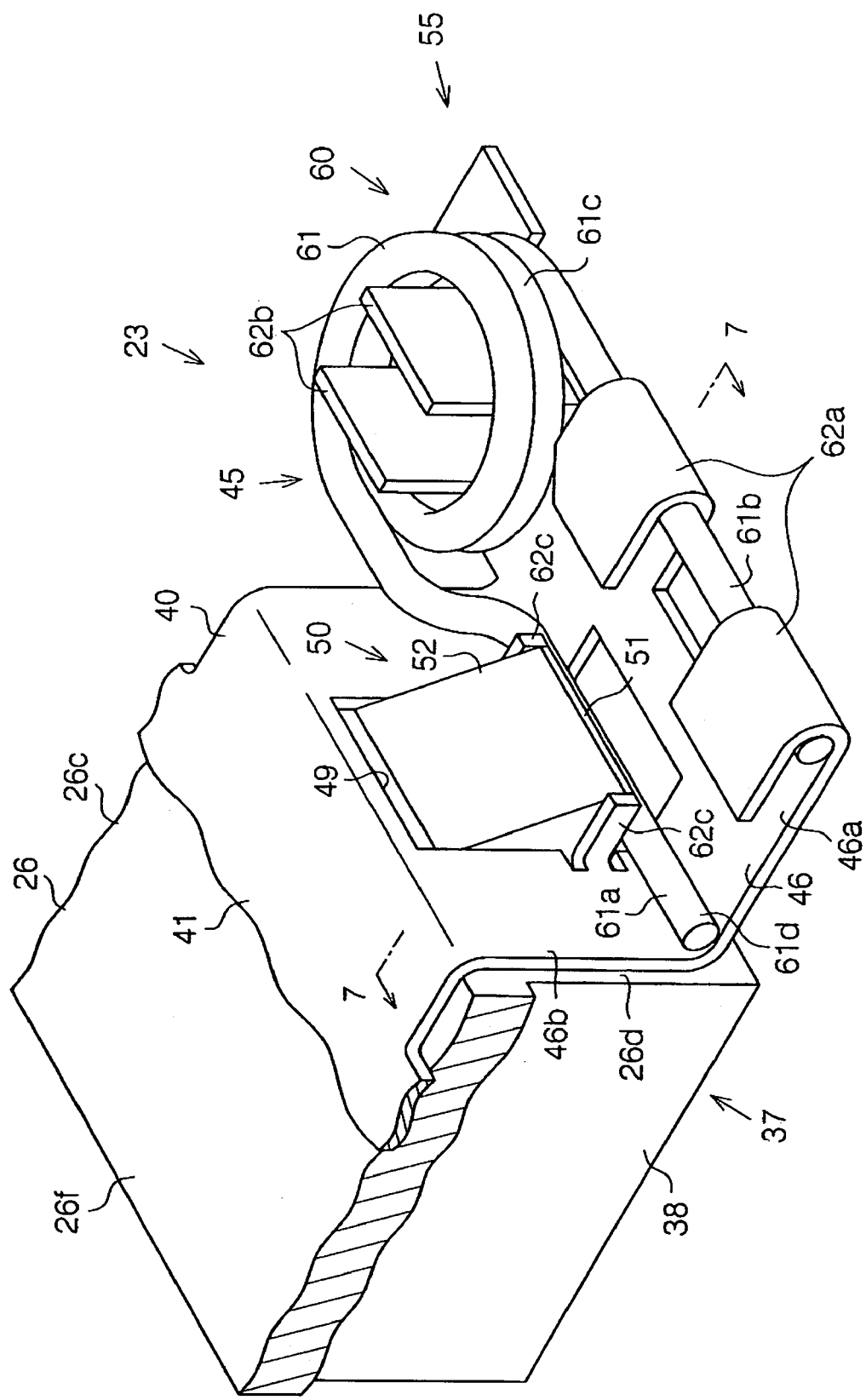
FIG. 5 is a partial perspective view showing a hook and a catch of a steering wheel according to a second embodiment of the present invention.
Figure 6:
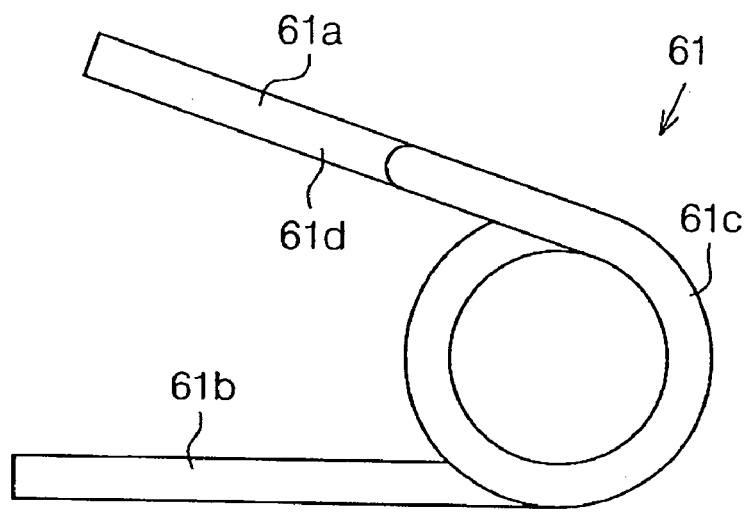
FIG. 6 is a plan view showing a coil spring.
Figure 7:
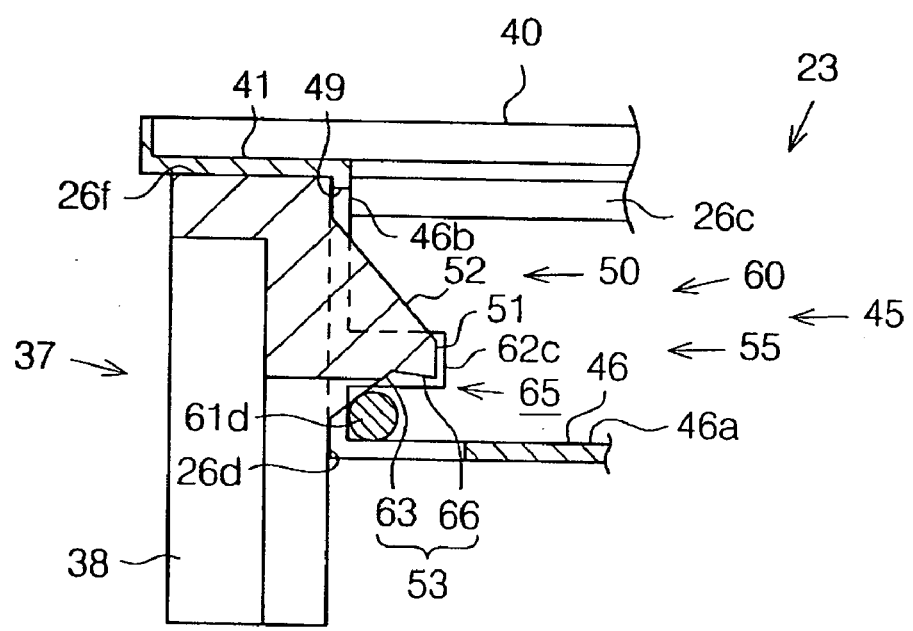
FIG. 7 is a cross-sectional view taken along line 7—7 in FIG. 5.

A steering wheel 1 according to a second embodiment of the present invention will now be described with reference to FIGS. 5 to 7. In FIGS. 5 to 7, like or same reference numerals are given to those components that are the same as the corresponding components of the first embodiment. The description centers on parts differing from the first embodiment. The second embodiment differs from the first embodiment in the structure of the catches 45 and the stabilizing mechanisms 55.

Referring to FIG. 5, each stabilizing mechanism 55 includes an urging mechanism 60 for urging the horn plate 40 toward the third spoke core 26c so that the frame 41 of the horn plate 40 constantly abuts against the upper surface 26f of the third spoke core 26c. The urging mechanism 60 includes a torsion spring (a pressing spring) 61, which is arranged on a spring support 46 formed on the horn plate 40.

As shown in FIGS. 5 and 6, the torsion spring 61 includes a coil 61c and two arms (first end 61a and second end 61b) extending from the coil 61c over a predetermined length. One of the arms is bent so that the first end 61a and the second end 61b lie along the same plane. Referring to FIG. 6, when there is no load applied to the torsion spring 61, the first end 61a and the second end 61b are separated from each other.

Referring to FIG. 5, the torsion spring 61 is held on a bottom wall 46a of the spring support 46 in a state in which the first end 61a and the second end 61b are arranged closer to each other than when there is no load (compressed state). In the torsion spring 61, the portion distal to the bent part of the first end 61a defines a pressing portion 61d. The pressing portion 61d is arranged at a position where it can press the associated hook 50.

The bottom wall 46a has two bent pieces 62a, which extend toward a connection wall 46b. The bent pieces 62a are engaged with the second end 61b of the torsion spring 61 and restrict movement of the second end 61b toward the boss core 25 and in directions perpendicular to the bottom wall 46a. The bottom wall 46a has two further bent pieces 62b extending upward at positions corresponding to the coil 61c of the torsion spring 61. The coil 61c is fitted to the bent pieces 62b. This restricts the movement of the coil 61c. The connection wall 46b also has two bent pieces 62c extending toward the boss core 25 from the edges of the opening 49. The bent pieces 62c are engaged with the first end 61a of the torsion spring 61 and restrict upward movement of the first end 61a. Accordingly, the torsion spring 61 is held on the spring support 46 so that the first end 61a and the second end 61b may be resiliently moved toward each other along the same plane in the winding direction of the coil 61c.

Referring to FIG. 7, the lower surface 53 of each hook 50 extends upward toward the distal surface 51 from the portion connected to the inner surface 26d. The lower surface 53 of the hook 50 includes a tapered portion 63, which functions as part of the urging mechanism 60. The tapered portion 63 increases the force applied to the hook 50 by the pressing portion 61d of the torsion spring 61 as the air bag module 30 moves away from the steering wheel body 23 (upward direction as viewed in FIG. 7).

As shown in FIG. 7, each hook 50 has a stopper 65 that prevents the pressing portion 61d of the associated torsion spring 61 from being disengaged from the hook 50 when the air bag module 30 is attached to the steering wheel body 23. The stopper 65 is formed in the hook 50 by an inclined portion 66 defined between the distal surface 51 and the tapered portion 63 of the lower surface 53. The distance between the inclined portion 66 and the bottom wall 46a of the spring support 46 decreases as the distal surface 51 becomes closer. That is, the inclined portion 66 is inclined in a direction opposite to the tapered portion 63. The inclined portion 66 also serves as a guide for guiding the pressing portion 61d of the torsion spring 61 toward an engaging position using the resilient force (urging force) of the torsion spring 61.

When attaching the air bag module 30 to the steering wheel body 23, the air bag module 30 is first arranged near the third spoke core 26c so that the pressing portion 61d of each torsion spring 61 comes into contact with the inclined surface 52 of the associated hook 50. In this state, pressure is applied to the air bag module 30 toward the third spoke core 26c. This moves the pressing portion 61d (first end 61a) of the torsion spring 61 along the inclined surface 52 and distal surface 51 of the hook 50 and moves the pressing portion 61d toward the second end 61b of the torsion spring 61. When further pressure is applied to the air bag module 30 and the pressing portion 61d moves past the distal surface 51 of the hook 50, the urging force of the torsion spring 61 moves the pressing portion 61d toward the connection wall 46b so that the pressing portion 61d abuts against the tapered portion 63 of the hook 50.

In this state, the distance between the first end 61a and second end 61b of the torsion spring 61 is less than that compared to when there is no load applied to the torsion spring 61. Thus, the pressing portion 61d of the torsion spring 61 constantly presses the tapered portion 63 of the hook 50. As a result, the pressing portion 61d moves along the tapered portion 63 toward the associated inner surface 26d of the third spoke core 26c (in the downward direction as viewed in FIG. 7). The application of force to the horn plate 40 in this manner abuts the lower surface of the frame 41 against the upper surface 26f of the third spoke core 26c. This stably holds the air bag module 30 on the steering wheel body 23.

To remove the air bag module 30 from the steering wheel body 23, the pressing portion 61d of each torsion spring 61 is forced toward the second end 61b to a release position with a tool, such as a driver. Then, the pressing portion 61d is moved upward along the inclined surface 52 of the hook 50. This releases the pressing portion 61d from the hook 50 and enables the air bag module 30 to be removed from the steering wheel body 23.

In addition to advantages (1), (2), and (4) of the first embodiment, the steering wheel 1 of the second embodiment has the advantages described below.

(5) Each stabilizing mechanism 55 includes the urging mechanism 60, which applies force to the horn plate 40 so that the frame 41 of the horn plate 40 and the third spoke core 26c constantly abut against each other. This accurately positions the horn plate 40 on the third spoke core 26c. Accordingly, the air bag module 30 is accurately positioned on the steering wheel body 23, and the appearance of the steering wheel 1 is improved.

The air bag module 30 is parallel to part of the third spoke core 26c. This increases the area of contact between the horn plate 40 and the third spoke core 26c. Accordingly, the air bag module 30 is held stably on the steering wheel body 23.

(6) Each urging mechanism 60 includes the tapered portion 63 of the associated hook 50 and the torsion spring 61, which has the pressing portion 61d for constantly pressing the tapered portion 63. The pressing force of the torsion spring 61 is applied to the tapered portion 63 of the hook 50 so that the frame 41 of the horn plate 40 abuts against the third spoke core 26c. This stably holds the air bag module 30 on the steering wheel body 23. Accordingly, the torsion spring 61 produces urging force that is used for engagement with the hook 50 and for stably holding the air bag module 30. Thus, like in the first embodiment, the coil springs 56 arranged between the horn plate 40 and the third spoke core 26c do not have to be separately provided. This reduces the number of components in the steering wheel 1 and lowers the manufacturing cost.

(7) The activation of the air bag device normally produces a force acting to move the air bag module 30 away from the steering wheel body 23. Thus, the pressing portion 61d of each torsion spring 61 has a diameter that enables such force to be sufficiently countered. The torsion spring 61 is held on the associated spring support 46 so that the pressing portion 61d (first end 61a) and the second end 61b are movable toward each other about the coil 61c. Thus, in comparison with the first embodiment in which the bar springs 47 are flexed, the torsion springs 61 may be flexed with a smaller force when attaching the air bag module 30 to the steering wheel body 23. This enables the air bag module 30 to be attached to the steering wheel body 23 with a small load and further facilitates the removal of the air bag module 30 from the steering wheel body 23.

(8) Each hook 50 has the stopper 65 that prevents the pressing portion 61d of the associated torsion spring 61 from being disengaged from the hook 50 when the air bag module 30 is attached to the steering wheel body 23. The stopper 65 includes the inclined portion 66, which guides the pressing portion 61d toward the engaging position with the resilient force (urging force) of the torsion spring 61. Further, the inclined portion 66 is formed so that the distance between the hook 50 and the spring support 46 increases as the distal surface 51 becomes closer. This prevents the torsion springs 61 of the horn plate 40 from being disengaged from the hooks 50 of the third spoke core 26c when the air bag device is activated even if the air bag module 30 moves away from the steering wheel body 23. Accordingly, with a simple structure, the air bag module 30 is prevented from being accidentally removed from the steering wheel body 23.

Figure 8:
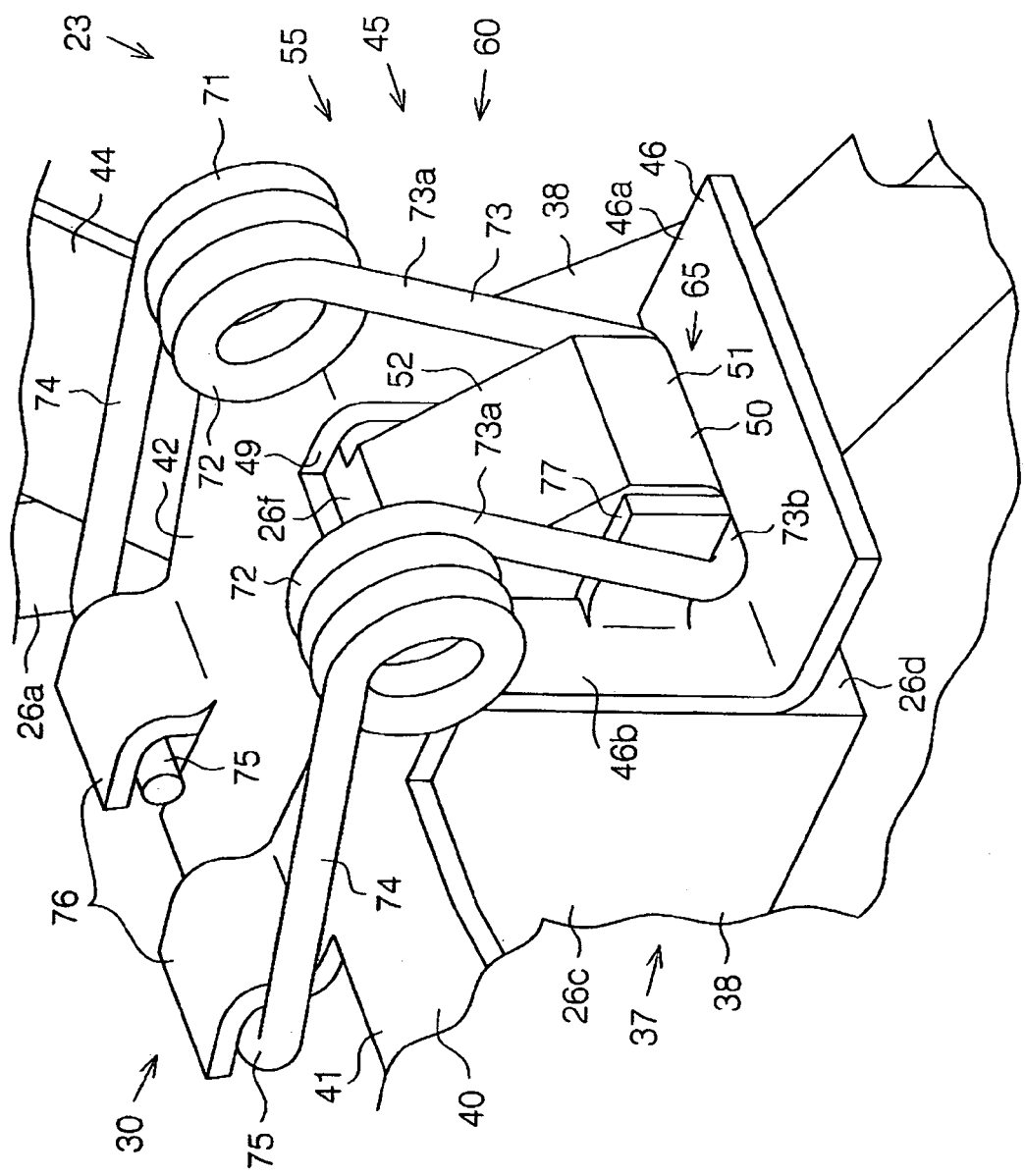
FIG. 8 is a partial perspective view showing a hook and a catch of a steering wheel according to a third embodiment of the present invention.

A steering wheel 1 according to a third embodiment of the present invention will now be described with reference to FIG. 8. In FIG. 8, like or same reference numerals are given to those components that are the same as the corresponding components of the second embodiment. The description centers on parts differing from the second embodiment.

Like in the second embodiment, in the third embodiment, each urging mechanism 60 has the hook 50, which includes the tapered portion 63 and the inclined portion 66, and a torsion spring (a pressing spring) 71, which includes a pressing portion for pressing the hook 50.

Referring to FIG. 8, each torsion spring 71 includes two coaxial coils 72 and a latch 73 connecting the two coils 72. The latch 73 includes two extending portions 73a, which extend from the two coils 72, and a connecting portion 73b, which connects the two extending portions 73a. The connecting portion 73b presses the tapered portion 63 of the associated hook 50. An arm 74 extends from the end of each coil 72 from the opposite side of the extending portion 73a. The arm 74 has an end 75 bent orthogonally toward the end 75 of the other arm 74. The torsion spring 71 is formed so that the ends 75 of the arms 74 move toward the connecting portion 73b of the latch 73 when there is no load applied to the torsion spring 71.

Two bent pieces 76 are formed on the frame 41 of the horn plate 40. The bent pieces 76 are engaged with the ends 75 of the torsion spring 71 to restrict movement of the ends 75 in an upward direction and towards the boss core 25. Further bent pieces 77 extend toward the boss core 25 from the edges of the opening 49 in the connection wall 46b of the spring support 46 to restrict upward movement of the connecting portion 73b of the latch 73.

The torsion spring 71 is mounted on the horn plate 40 in a state in which the connecting portion 73b of the latch 73 is separated from the ends 75 of the arms 74 about the coils 72.

The steering wheel 1 of the third embodiment has advantages (1), (2), and (4) to (8) of the above embodiments.

Figure 9:
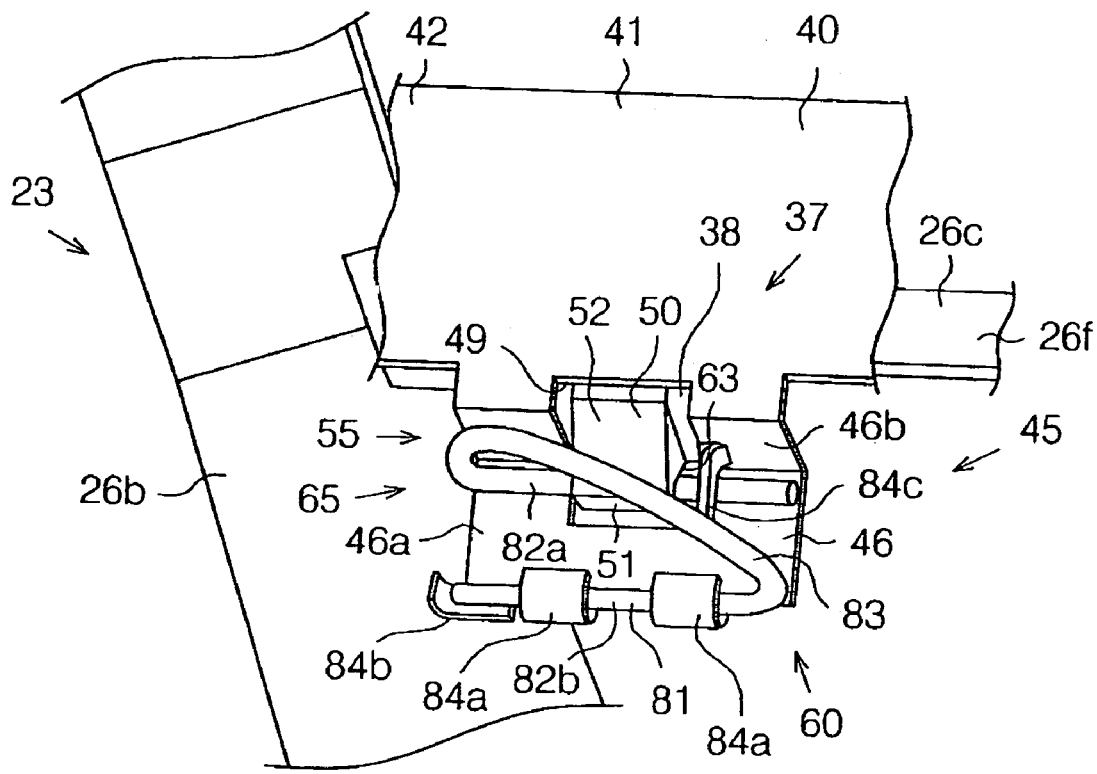
FIG. 9 is a partial perspective view showing a hook and a catch of a steering wheel according to a fourth embodiment of the present invention.

A steering wheel 1 according to a fourth embodiment of the present invention will now be described with reference to FIG. 9. In FIG. 9, like or same reference numerals are given to those components that are the same as the corresponding components of the second embodiment. The description centers on parts differing from the second embodiment.

Like in the second embodiment, in the fourth embodiment, each urging mechanism 60 has the hook 50, which includes the tapered portion 63 and the inclined portion 66, and an S-shaped spring (a pressing spring) 81, which includes a pressing portion for pressing the hook 50. The fourth embodiment differs from the second embodiment in the shape of the spring.

As shown in FIG. 9, the S-shaped spring 81 includes straight portions 82a and 82b, which are defined on the ends of the S-shaped spring 81, and a curved portion 83, which is arcuate and connects the straight portions 82a and 82b. The S-shaped spring 81 is S-like when seen from above the steering wheel body and semi-circular when seen from the boss core 26c. The straight portion 82a of the S-shaped spring 81 functions as a pressing portion for pressing the tapered portion 63 of the associated hook 50.

The spring support 46 of the horn plate 40 has two bent pieces 84a extending from the bottom wall 46a toward the connection wall 46b. The bent pieces 84a hold the straight portion 82b of the S-shaped spring 81 and restrict movement of the straight portion 82b toward the boss core 25 and in directions perpendicular to the bottom wall 46a. A further bent piece 84b extends upward from the bottom wall 46a at a position corresponding to the end of the straight portion 82b. The bent piece 84b restricts movement of the straight portion 82b in the axial direction of the straight portion 82b. Another bent piece 84c extends toward the boss core 25 from the edge of the opening 49 in the connection wall 46b. The bent piece 84c is engaged with the other straight portion 82a of the S-shaped spring 81 to restrict upward movement of the straight portion 82a. The bent pieces 84a to 84c hold the S-shaped spring 81 on the spring support 46 so that the straight portion 82a is movable toward the other straight portion 82b along the same plane.

The steering wheel 1 of the fourth embodiment has advantages (1), (2), and (4) to (8) of the above embodiments.

Figure 10:
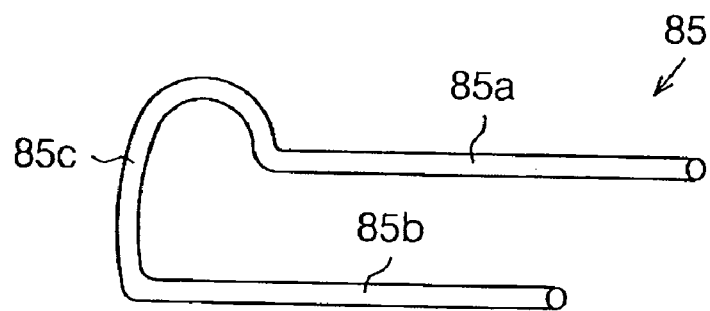
FIG. 10 is a perspective view showing a modification of the spring.

The fourth embodiment may be deformed in the following manner. The fourth embodiment is not limited to the S-shaped spring 81 of FIG. 9. For example, a spring shown in FIG. 10 may be used. The spring 85 has straight portions 85a and 85b, which are defined on the ends of the spring 85, and a curved portion 85c, which is arcuate and connects the same sides of the straight portions 85a and 85b.

Figure 11:
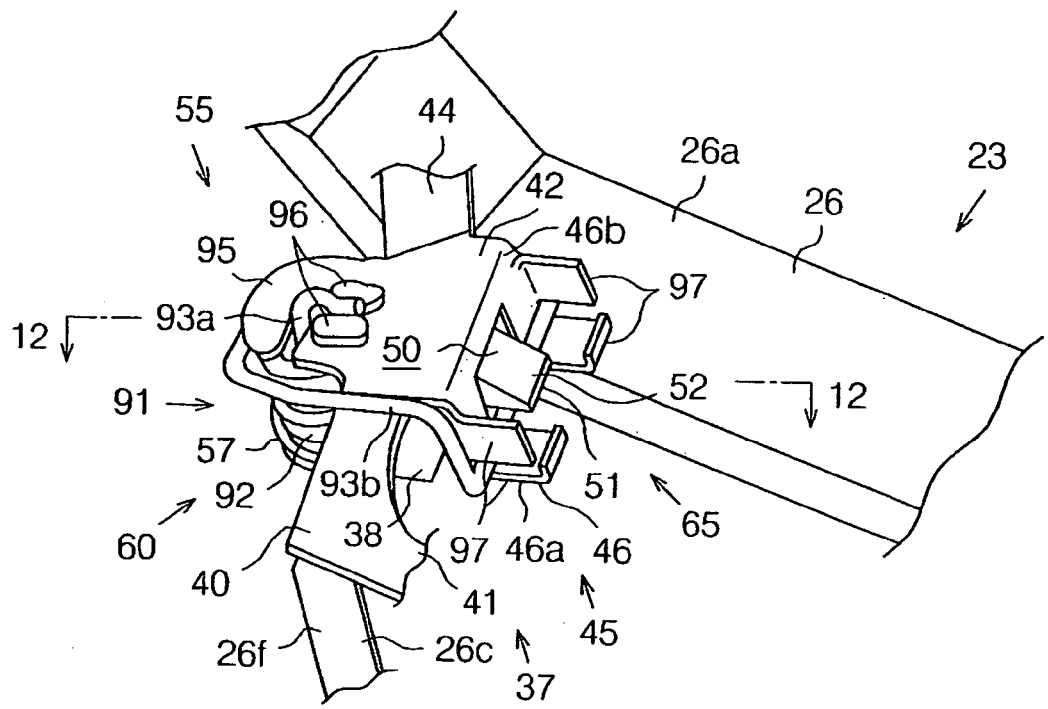
FIG. 11 is a partial perspective view showing a hook and a catch of a steering wheel according to a fifth embodiment of the present invention.
Figure 12:
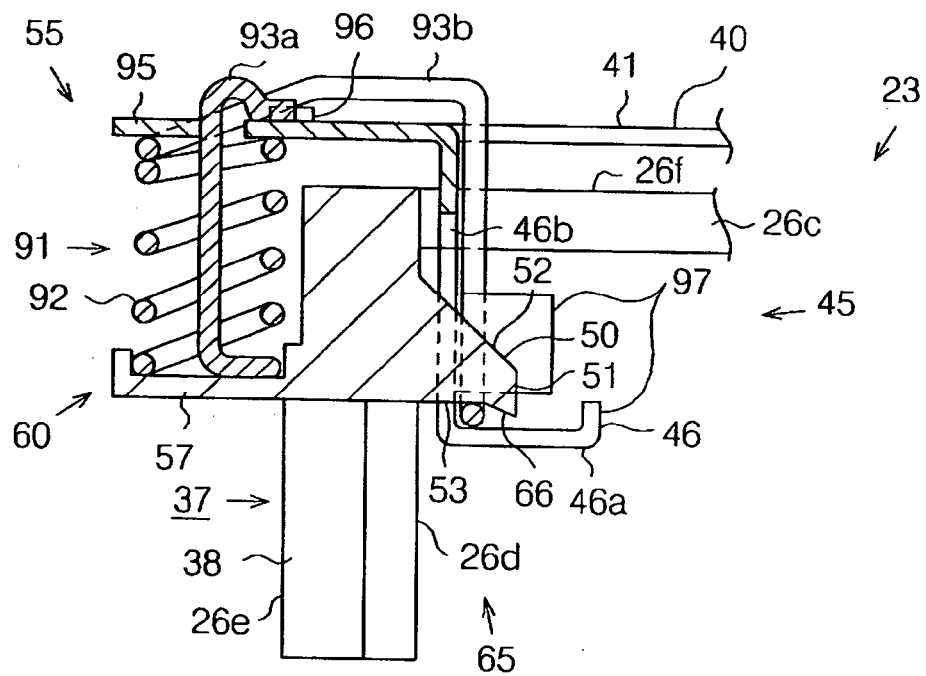
FIG. 12 is a cross-sectional view taken along line 12—12 in FIG. 11.
Figure 13:
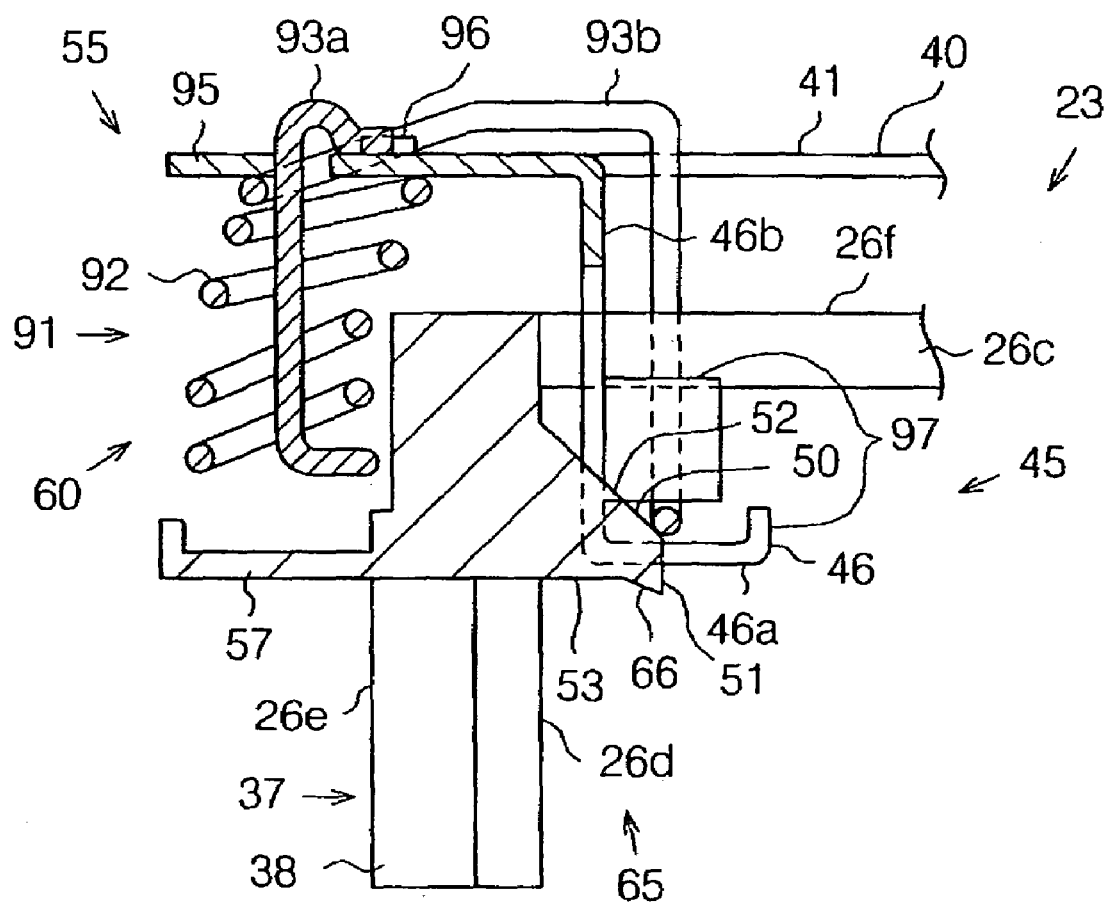
FIG. 13 is a partial cross-sectional view showing a coil spring when an air bag module is attached to a steering wheel body.

A steering wheel 1 according to a fifth embodiment of the present invention will now be described with reference to FIGS. 11 to 13. In FIGS. 11 to 13, like or same reference numerals are given to those components that are the same as the corresponding components of the first embodiment. The description centers on parts differing from the first embodiment.

In the steering wheel 1 of the fifth embodiment, each stabilizing mechanism 55 includes a coil spring 91 for urging the horn plate 40 away from the third spoke core 26c. The coil spring 91 serves as part of the associated catch 45.

Referring to FIGS. 11 and 12, the coil spring 91 includes a coil 92 and extensions 93a and 93b, which extend from the ends of the coil 92. The extension 93a extends through the coil 92 and projects out of the coil 92 near the other extension 93b. The projected distal portion of the extension 93a is bent toward the coil 92 and then bent again at a substantially right angle. The other extension 93b extends from the coil 92 toward the associated hook 50 of the third spoke core 26c. The distal portion of the extension 93b is bent parallel to the inclined surface 52 (distal surface 51) of the hook 50. The portion of the extension 93b parallel to the inclined surface 52 of the hook 50 functions as a pressing portion for pressing the hook 50.

An upper seat 95 extends from the frame 41 of the horn plate 40 in a direction opposite to the spring support 46. The upper seat 95 holds the distal end of the extension 93a of the coil spring 91 and is engaged with the other extension 93b. A pair of protrusions 96 protrude upward from the frame 41 of the horn plate 40 sandwiching the distal end of the extension 93a held by the upper seat 95. The protrusions 96 are formed by, for example, pressing the frame 41.

A plurality of bent pieces 97 (four in the fifth embodiment) extend from the spring support 46 of the horn plate 40 to restrict movement of the pressing portion of the other extension 93b in the vertical direction (the directions perpendicular to the frame 41).

As shown in FIG. 12, the third spoke core 26c includes a lower seat 57 engaged with the basal end of the extension 93a at a position corresponding to the upper seat 95 of the frame 41. Each hook 50 of the third spoke core 26c has an inclined portion 66, which functions as a stopper 65.

The distal end of the extension 93a of the coil spring 91 is held between the protrusions 96. The basal end of the other extension 93b is engaged with the upper seat 95 of the frame 41. Thus, the horn plate 40 holds the coil spring 91. When the coil spring 91 is held by the horn plate 40 in this manner, the basal end of the extension 93b is movable in a state contacting the upper seat 95, and the coil 92 is inclinable with respect to the frame 41.

Referring to FIG. 13, when attaching the air bag module 30 to the steering wheel body 23, pressure is applied to the air bag module 30 toward the third spoke core 26c. This causes the extension 93b of each coil spring 91 to move along the inclined surface 52 and the distal surface 51 of the associated hook 50. In this state, the upper portion of the coil 92 of the coil spring 91 flexes toward the horn plate 40, and the other extension 93b entirely moves toward the boss core 25 in a parallel manner. When the extension 93b passes by the distal surface 51 of the hook 50, the resilient force (urging force) of the coil 92 engages the lower surface 53 of the hook 50.

In addition to advantages (1), (2), (4), and (8) of the above embodiments, the steering wheel 1 of the fifth embodiment has the advantages described below.

(9) Each coil spring 91 forms part of the associated catch 45. Thus, the urging of the horn plate 40 away from the third spoke core 26c and the engagement with the associated hook 50 of the third spoke core 26c are performed with the single component of the bar spring 47. Consequently, the air bag module 30 is held stably on the steering wheel body 23 with fewer components.

(10) Each coil spring 91 is arranged so that the coil 92 may be flexed to incline toward the horn plate 40. The flexing of the coil 92 is used to attach the air bag module 30 to the steering wheel body 23 with a small load.

The extension of the coil spring 91 moves parallel to the inclined surface 52 and distal surface 51 of the hook 50. Thus, contact of the extension 93b with the inclined surface 52 and the distal surface 51 is not concentrated at certain locations. Thus, the air bag module 30 is attached to the steering wheel body 23 with a small load.

The first to fifth embodiments may be modified as described below.

In the second to fourth embodiments, instead of using the torsion springs 61 and 71 or the S-shaped springs 81, bar springs, which are arranged on the spring supports 46 as shown in FIG. 2, may be used.

In the second to fourth embodiments, instead of forming the inclined portion 66 on the lower surface 53 of each hook 50, for example, a projection may be projected downward from the distal portion of the lower surface 53 of the hook 50. This would also make disengagement of the catch 45 and the hook 50 difficult.

In the fifth embodiment, the coil of a coil spring may be arranged beside the hook 50 near the inner surface 36d of the third spoke core 26c. In this case, one of the ends extending from the coil is movable about the coil to press the hook 50.

The first to fifth embodiments are applied to the steering wheel 1, which has three spokes 22. However, the present invention may also be embodied in a steering wheel having four or more spokes.

In the first to fifth embodiments, the pad 33 of the air bag module 30 moves relative to the steering wheel body 23 by way of the horn switch mechanism 36. However, the present invention may also be embodied in a steering wheel having a pad 33 that does not move relative to the steering wheel body 23 but has a horn button, which forms part of the horn switch mechanism 36 and which is movable relative to the steering wheel body 23.

The first to fifth embodiments are applied to a steering wheel 1 to which an air bag module 30 having a horn switch mechanism 36 is attached. However, the present invention may be applied to a steering wheel to which an air bag module 30 that does not have the horn switch mechanism 36 is attached.

A steering wheel according to a sixth embodiment of the present invention will now be discussed with reference to FIG. 14. The description will center on parts differing from the first embodiment.

Figure 14:
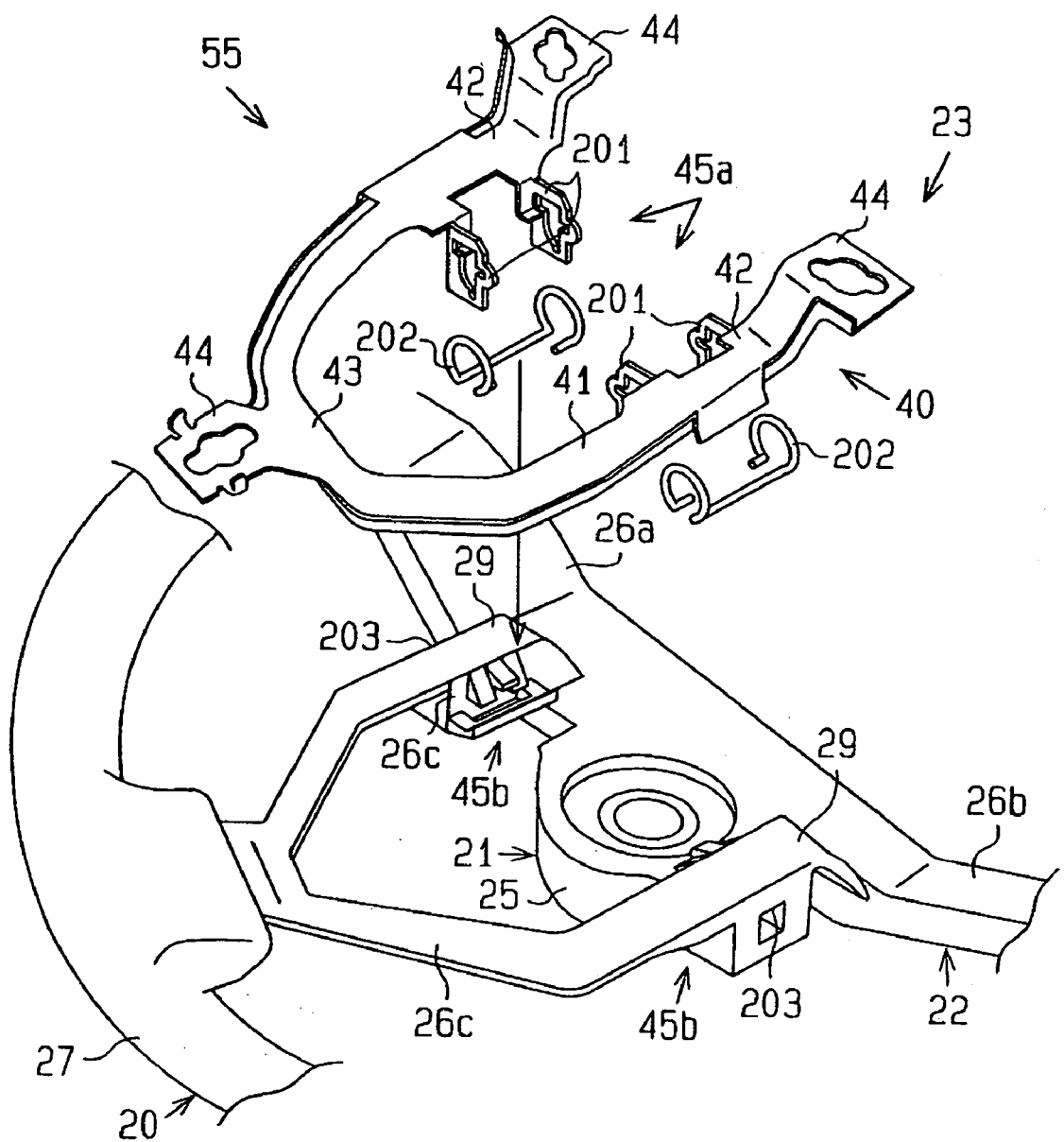
FIG. 14 is an exploded perspective view showing the relationship between a core and a horn plate of a steering wheel according to a sixth embodiment of the present invention.

Referring to FIG. 14, in the sixth embodiment, horn plate catches 45a (second engaging portions) are engaged with spoke hooks 45b (first engaging portions) to attach the air bag module 30 to the steering wheel body 23. The structure and operation of the catches 45a and the hooks 45b will now be discussed.

Figure 15:
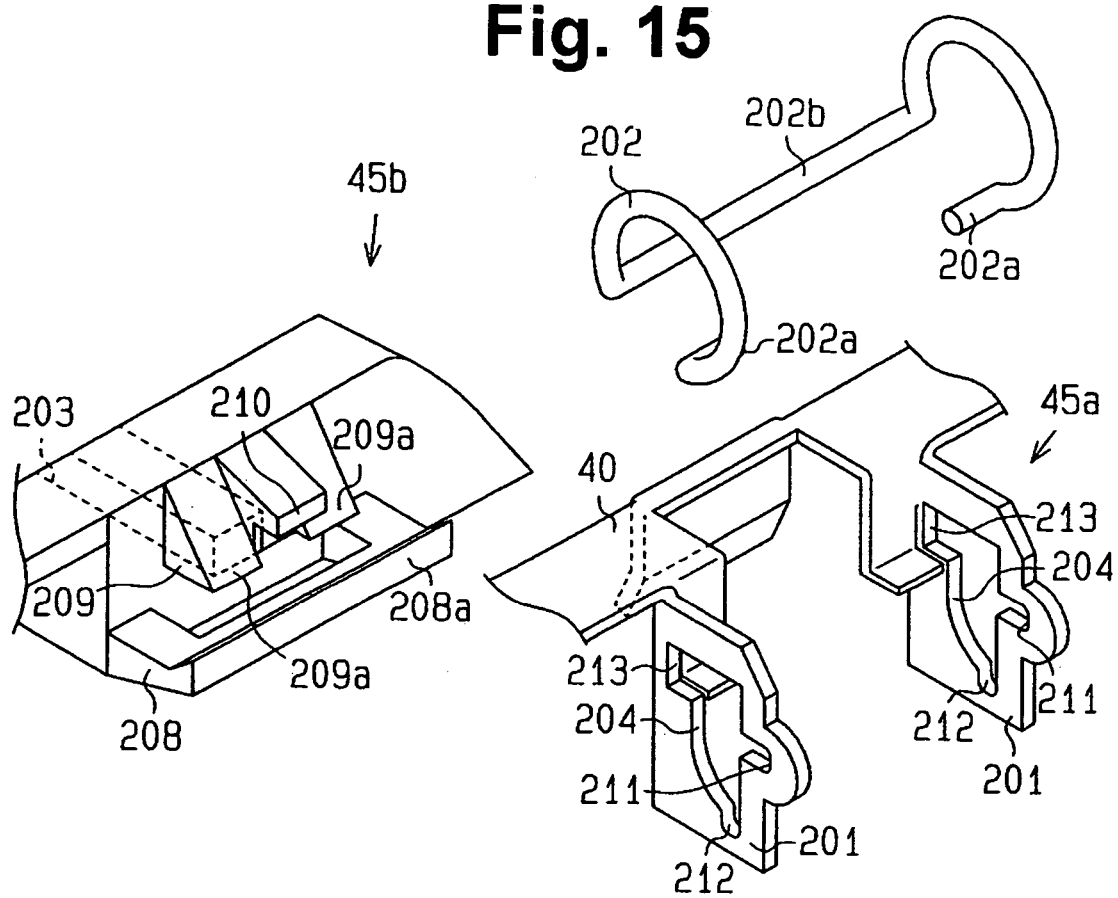
FIG. 15 is an enlarged, exploded perspective view of FIG. 14 showing the structure of a catch and hook.

As shown in FIGS. 14 and 15, each spoke hook 45b includes first, second, and third tongues (projections) 208, 209, and 210, which extend toward the boss core 25. The tongues 208, 209, and 210 extend from the inner surface 26d of the third spoke core 26c near the portions connected to the first spoke core 26a or second spoke core 26b.

Figure 16:
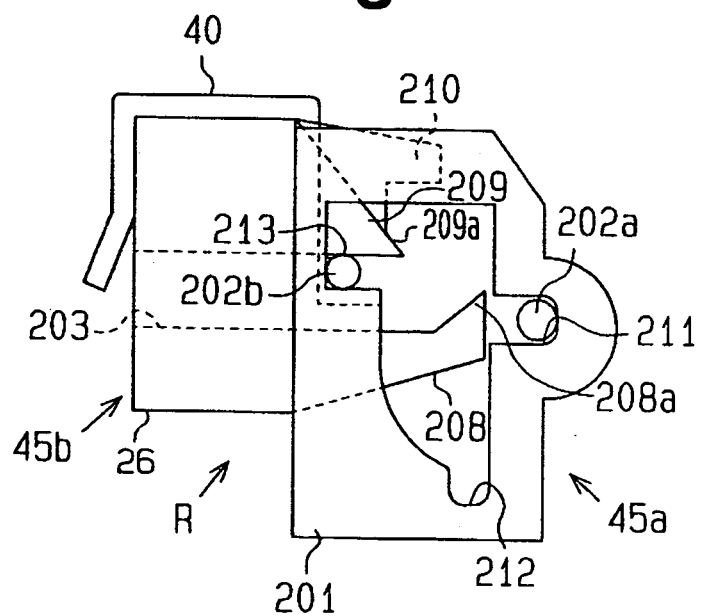
FIG. 16 is an enlarged front view of FIG. 14 showing the structure of a lock mechanism.

As shown in FIGS. 15 and 16, each horn plate catch 45a includes a pair of parallel arms 201 extending perpendicular to the horn plate 40. A lock spring 202 having pivot shafts 202a and a movable shaft 202b is connected to the arms 201. The movable shaft 202b is opposed to the pivot shafts 202a and is urged away from the pivot shaft 202a. The arms 201 each have a first notch 211 and a second notch 212. In a state in which the movable shaft 202b is forced toward the pivot shafts 202a, each first notch 211 is engaged with one of the pivot shafts 202a of the spring 202, and each second notch 212 is engaged with the movable shaft 202b. A guide 204 is defined on each arm 201 to guide the movable shaft 202b of the spring 202 from the second notch 212 toward a third notch 213. The spring 202 is located at a lock position when the second notch 212 is received in each third notch 213. The guide 204 is formed along an arc having a predetermined radius of curvature to aid the pivoting of the movable shaft 202b about the pivot shafts 202a.

The first tongue 208 of each spoke hook 45b extends from the third spoke core 26c and is arranged between the associated pair of arms 201 of the horn plate 40. When attaching the horn plate 40 to the third spoke core 26c, pressure is applied to the horn plate 40 to disengage the movable shaft 202b of the spring 202 from the second notches 212. This moves the movable shaft 202b along the guides 204 to the lock position, or the third notches 213. A slope 208a is formed on the distal end of the first tongue 208 to aid the disengagement of the movable shaft 202b from the second notch 212 and the movement of the movable shaft 202b along the guide 204 to the third notch 213.

The second tongues 209 of each spoke hook 45b extend from the spoke core 26c. When the second tongues 209 are arranged between the two associated arms 201 of the horn plate 40 and the movable shaft 202b of the spring 202 is arranged in the third notches 213, the second tongues 209 cooperate with the third notches 213 to hold the movable shaft 202b. This fastens the movable shaft 202b. Further, an inclined surface 209a is defined on the upper portion of each second tongue 209. The inclined surface 209a aids the movable shaft 202b disengaged from the third notches 213 when an external force applied through a hole 203 resiliently flexes the movable shaft 202b a predetermined amount. The hole 203 extends through the third spoke core 26c from below the second tongues 209 to enable insertion of a tool (e.g., a driver) for disengaging the movable shaft 202b from the third notches 213.

The third tongue 210 of each spoke hook 45b is arranged above the second tongue 209. During removal of the horn plate 40 from the third spoke core 26c, when the horn plate 40 is lifted, the third tongue 210 cooperates with the guides 204 to move the movable shaft 202b, disengaged from the third notch 213, to the second notches 212. The spring 202 is located at an initial position when the movable shaft 202b is received in the second notches 212.

Referring to FIGS. 15 and 16, in each arm 201, the third notch 213 is opposed to the first notch 211, which is engaged with the pivot shaft 202a of the spring 202, and is located farther from the steering wheel body 23 than the third notch 213. The second notch 212 is located closer to the steering wheel body 23 than the third notch 213. The associated horn plate catch 45a, spoke hook 45b, and lock spring 202 form a lock mechanism R.

In the sixth embodiment, steps (a) to (d) are performed to attach the horn plate 40 to the steering wheel body 23, or the third spoke core 26c. Steps (a) to (d) will now be described with reference to FIG. 17A to 17D.

Steps (a) to (d) are performed under the presumption that force is always applied to the movable shaft 202b of each lock spring 202 and that the arms 201 are pressed in a substantially vertical direction with respect to the third spoke core 26c when pressure is applied to the horn plate 40.

(a) The pivot shafts 202a of the lock spring 202 are engaged with the first notches 211 of the associated arms 201 and the movable shaft 202b is engaged with the second notches 212 (initial state).

(b) The application of pressure to the horn plate 40 causes the slope 208a of the first tongue 208 to disengage the movable shaft 202b from the second notches 212.

(c) Subsequent to disengagement, further application of pressure to the horn plate 40 moves the movable shaft 202b, which is supported by the slope 208a of the first tongue 208, along the guides 204.

(d) The movable shaft 202b of the lock spring 202 then reaches and engages the third notches 213. The movable shaft 202b is fastened (locked) between the lower surface of the second tongues 209 and the third notches 213.

Figure 18:
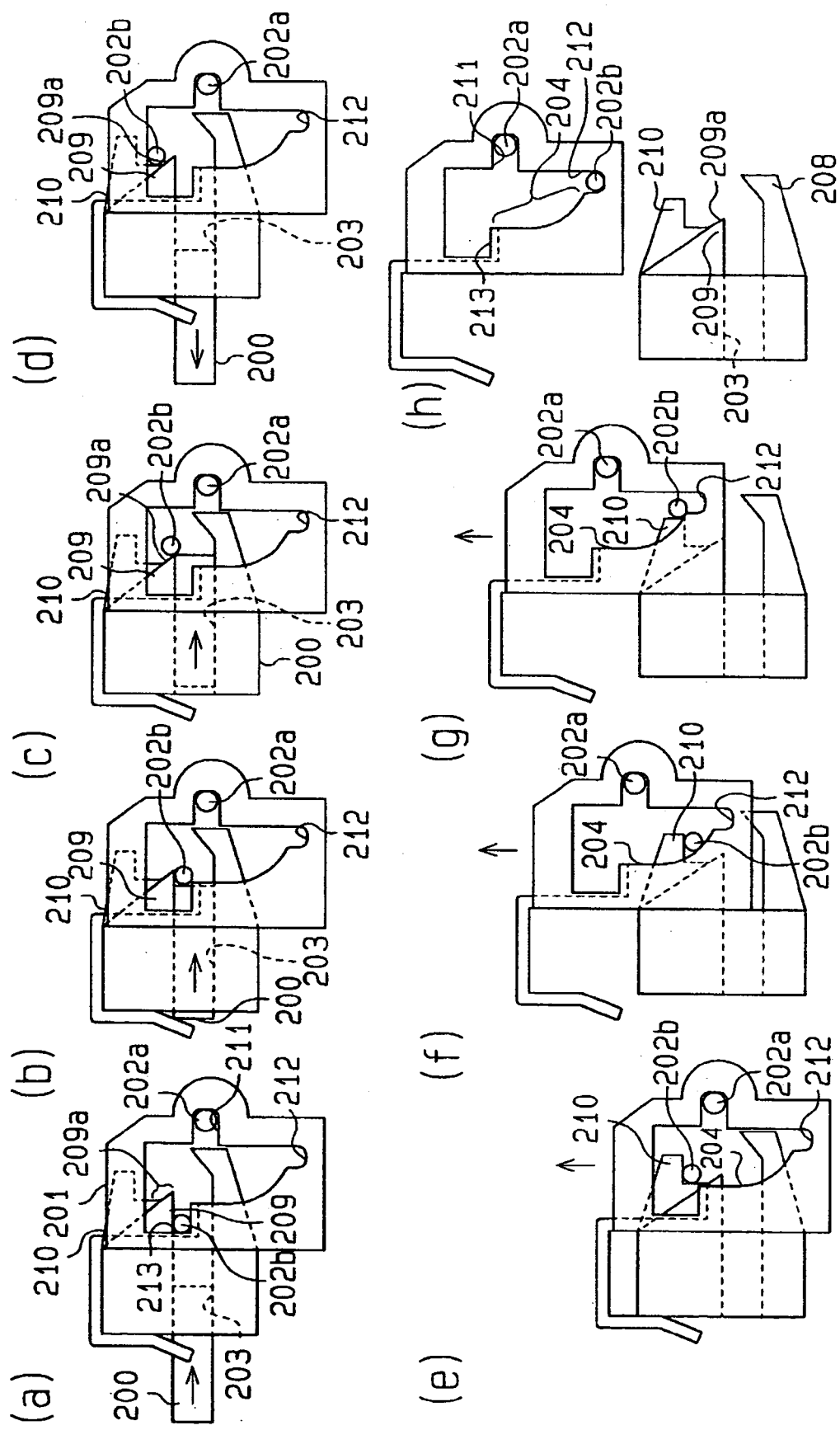
FIG. 18 is a diagram showing the procedures for removing the horn plate from the core of the steering wheel.

In the sixth embodiment, steps (a) to (h) are performed to remove the horn plate 40 from the steering wheel body 23, or the third spoke core 26c. Steps (a) to (h) will now be described with reference to FIG. 18.

Step (a) A tool 200, such as a driver, is inserted through the hole 203.

Step (b) The tool 200 applies external force to the movable shaft 202b of the lock spring 202 and disengages the movable shaft 202b from the third notches 213.

Step (c) The movable shaft 202b disengaged from the third notches 213 comes into contact with the inclined surface 209a of the second tongues 209.

Step (d) The tool 200 is removed from the hole 203. In this state, the movable shaft 202b remains disengaged from the third notches 213.

Step (e) The horn plate 40 is lifted.

Step (f) The lifting of the horn plate 40 moves the movable shaft 202b, which is in contact with the third tongue 210, downward along the guides 204 in the arms 201.

Step (g) The movable shaft 202b is guided to the second notches 212 of the arms 201.

Figure 17A:
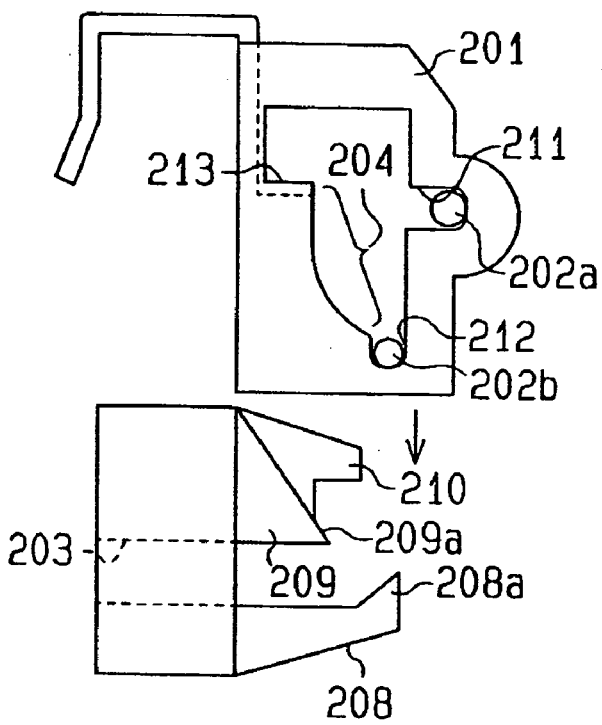
FIGS. 17A to 17D are diagrams showing the procedures for attaching the horn plate to a core of a steering wheel.
Figure 17B:
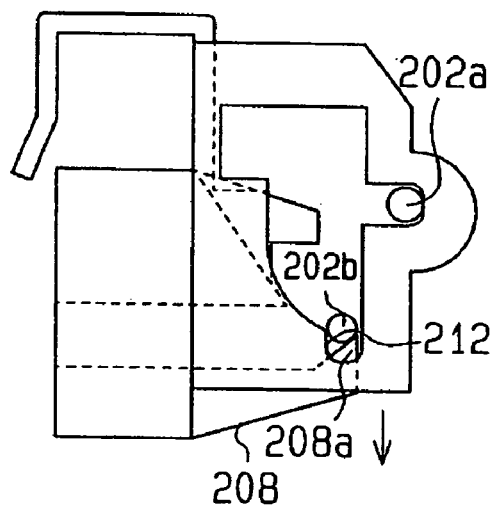
Figure 17C:
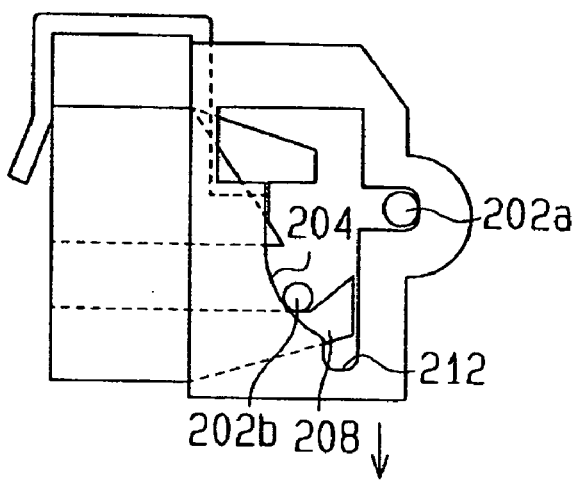
Figure 17D:
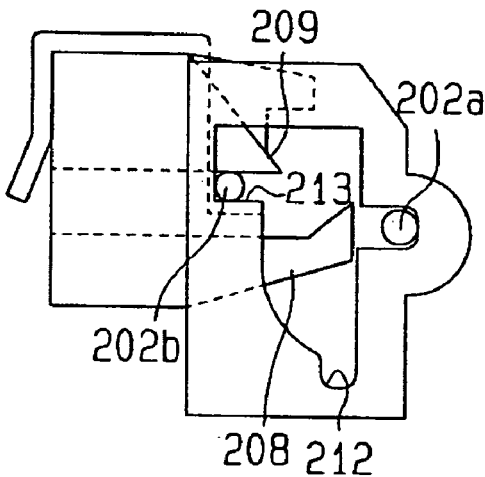

Step (h) After the removal of the horn plate 40 is completed, the movable shaft 202b of the lock spring 202 is held in the second notches 212. That is, the lock spring 202 automatically returns to the initial state prior to attachment as shown in FIG. 17A.

Steps (a) to (d) may be performed separately or simultaneously on the two lock mechanisms R.

The sixth embodiment has the advantages described below.

(11) Each spring 202 (movable shaft 202b) is pivoted about the pivot shafts 202a to engage and disengage the associated catch 45a and hook 45b. Thus, the horn plate 40 is easily attached to and removed from the third spoke core 26c. Each lock mechanism R automatically returns the spring 202 to the initial state, which is the state prior to attachment of the horn plate 40 to the third spoke core 26c, when the horn plate 40 is removed from the third spoke core 26c. Thus, when reattaching the horn plate 40 to the third spoke core 26c, there is no need for preparation.

(12) The arms 201 are provided on the horn plate 40. The first, second, and third tongues 208, 209, and 210 are provided on the third spoke core 26c. Each lock mechanism R is used effectively since it engages and disengages the associated catch 45a and hook 45b and ensures the initialization of the spring 202 subsequent to the removal of the horn plate 40.

(13) The third notches 213 are arranged opposing the first notches 211, which are engaged with the pivot shafts 202a of the spring 202, at a position higher than the first notches 211. The second notches 212 are arranged on the other side of the guides 204 at a position lower than the third notches 213. After the horn plate 40 is attached to the third spoke core 26c, due to the positional relationship between the first notches 211 and the third notches 213, the urging force of the spring 202 acts to firmly hold the horn plate 40 on the third spoke core 26c. This stably keeps the horn plate 40 in a locked state.

(14) Each guide 204 is formed along an arc having a predetermined radius of curvature to aid the pivoting of the movable shaft 202b about the pivot shafts 202a. Due to the arms 201 of each lock mechanism R., the horn plate 40 is smoothly attached to, and removed from the third spoke core 26c.

(15) In the sixth embodiment, the distal end of each first tongue 208 has the slope 208a. The slope 208a is used to disengage the movable shaft 202b of the spring 202 from the second notches 212 and to cooperate with the guide 204 to move the movable shaft 202b of the spring 202 to the third notches 213. The first tongue 208 of each lock mechanism R functions to smoothen the attachment of the horn plate 40 to the third spoke core 26c.

(16) The upper portion of each second tongue 209 includes the inclined surface 209a. The inclined surface 209a aids the movable shaft 202b disengaged from the third notches 213 when the application of an external force resiliently flexes the movable shaft 202b a predetermined amount. Accordingly, the second tongue 209 of each lock mechanism R functions to smoothen the removal of the horn plate 40 from the third spoke core 26c.

The sixth embodiment may be modified as described below.

The inclined surfaces 209a may be curved.

The guides 204 do not have to be curved and may be an inclined surface.

In the sixth embodiment, a stabilizing mechanism may be used to prevent the air bag module 30 from chattering on the steering wheel body 23. For example, an urging member, such as a coil spring, may be used to urge the horn plate 40 away from the third spoke core 26c.

Figure 19:
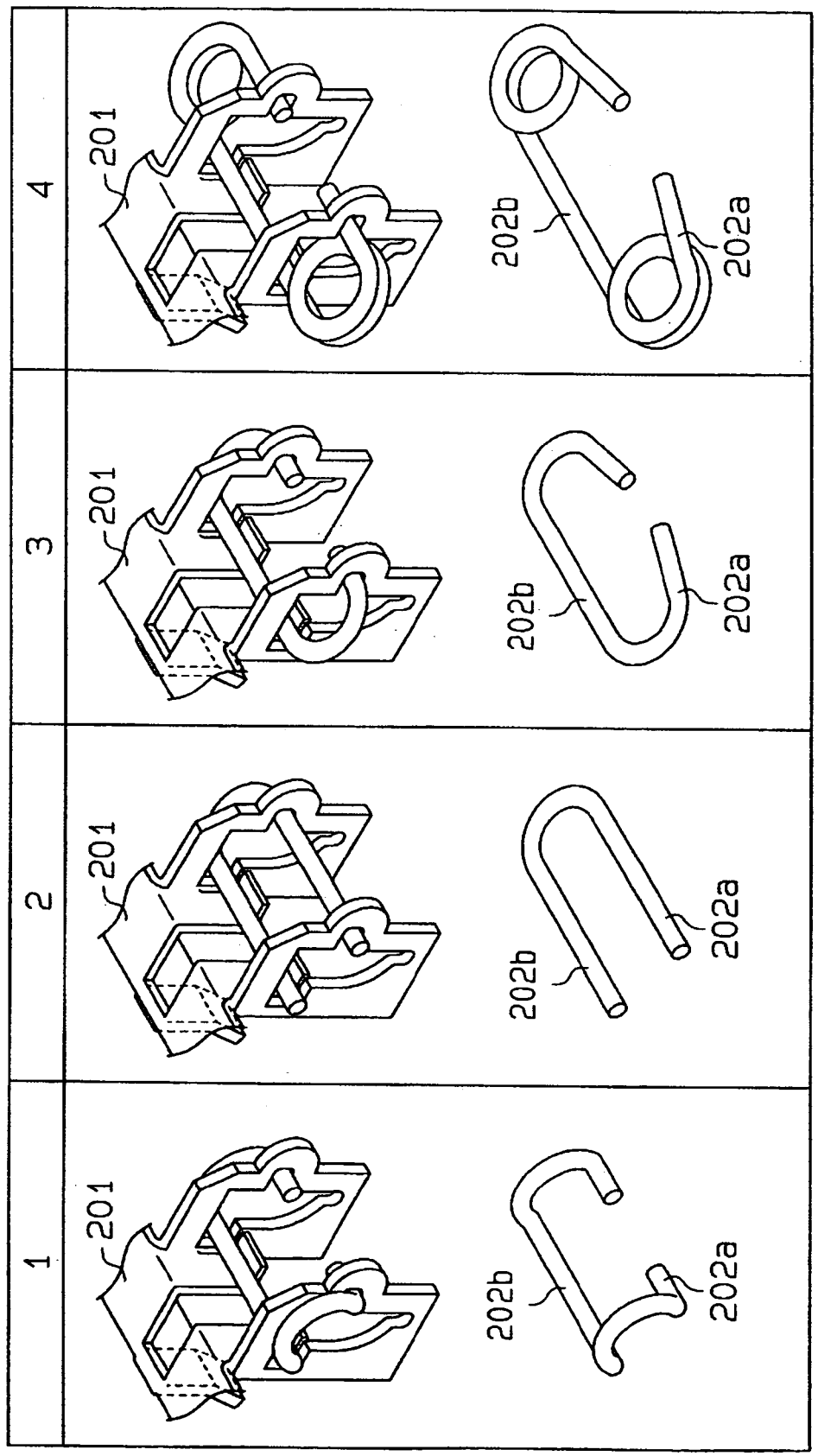
FIG. 19 is a chart showing modifications of a lock spring.
Figure 20A:
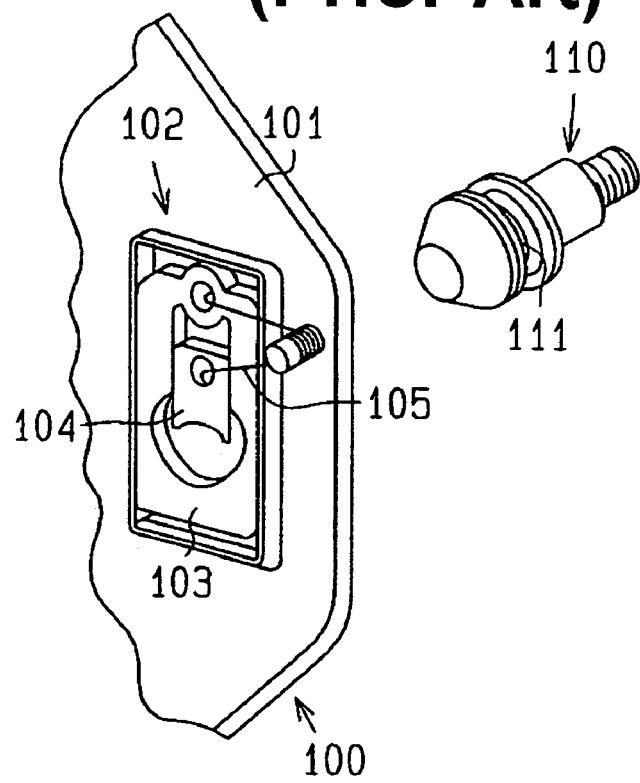
FIG. 20A is a partial perspective view showing a catch prior to attachment of an air bag module in a prior art steering wheel.
Figure 20B:
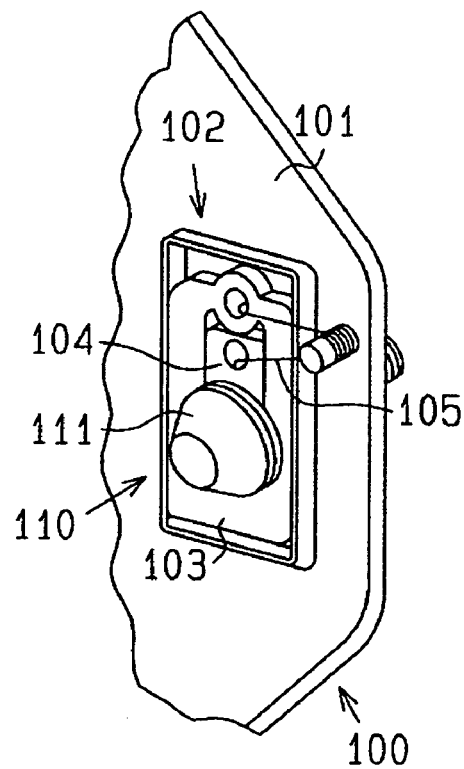
FIG. 20B is a partial perspective view showing the catch subsequent to attachment of the air bag module in the prior art steering wheel.

In the sixth embodiment, the shape of the lock spring 202 is as shown in box 1 of FIG. 19. However, the lock spring 202 may have other shapes, such as shapes shown in boxes 2 to 4 of FIG. 19.

In the sixth embodiment, the arms 201 are arranged on the horn plate 40. The first, second, and third tongues 208, 209, and 210 are arranged on the third spoke core 26c. Conversely, the first, second, and third tongues 208, 209, and 210 may be arranged on the horn plate 40, and the arms 201 may be arranged on the third spoke core 26c. In this case, the same advantages as the sixth embodiment are obtained.

In the steering wheel incorporating the horn switch mechanism 36 of the sixth embodiment, the lock mechanisms R are provided at portions where the spoke core 26 is engaged with the horn plate 40. However, lock mechanisms may be provided at portions where the core of the steering wheel body is engaged with the air bag module. For example, in a steering wheel that does not have the horn switch mechanism 36, instead of the horn plate 40, a lock mechanism may be provided on an attachment plate directly fixed to the bag holder 34 or may be formed integrally with the bag holder 34.

It should be apparent to those skilled in the art that the present invention may be embodied in many other specific forms without departing from the spirit or scope of the invention. Therefore, the present examples and embodiments are to be considered as illustrative and not restrictive, and the invention is not to be limited to the details given herein, but may be modified within the scope and equivalence of the appended claims.

What is claimed is:

1. A steering wheel for incorporating an air bag device, the steering wheel comprising:
   a steering wheel body including a core;
   an air bag module attached to the steering wheel body;
   a metal plate arranged in the air bag module facing towards the core;
   a first engaging portion arranged on one of the core and the metal plate;
   a second engaging portion arranged on the other one of the core and the metal plate to resiliently engage the first engaging portion; and
   a stabilizing mechanism for preventing the air bag module from chattering on the steering wheel body, wherein the stabilizing mechanism includes a spring for urging the metal plate away from the core, with the spring having an end forming part of the second engaging portion.

2. The steering wheel according to claim 1, wherein the spring is a coil spring having a coil, with the coil being inclined when the end moves along the first engaging portion.

3. The steering wheel according to claim 1, wherein the first engaging portion is a hook and the second engaging portion includes a resilient member resiliently engageable with the hook, and wherein the hook has a stopper for preventing the hook and the resilient member from being disengaged.

4. The steering wheel according to claim 3, wherein the hook has an engaging position where the resilient member is held and a release position where the resilient member is disengaged from the hook, with the stopper having a guide that uses the resiliency of the second engaging portion to guide the resilient member to the engaging position.

5. The steering wheel according to claim 1, wherein the core includes an annular rim core, a boss core arranged in the center of the rim core, and a plurality of spoke cores connecting the boss core to the rim core, with at least one of the spoke cores having a bendable portion that is bent when the rim core is displaced, and connection portion at which said at least one of the spoke cores and the rim core are connected being closer to the first engaging portion than the bendable portion.

6. The steering wheel according to claim 1, wherein the first engaging portion is a hook arranged on the core and the second engaging portion is a catch arranged on the metal plate and including a resilient member resiliently engageable with the hook.

7. A steering wheel for incorporating an air bag device, the steering wheel comprising:
   a steering wheel body including a core;
   an air bag module attached to the steering wheel body;
   a metal plate arranged in the air bag module facing towards the core;
   a first engaging portion arranged on one of the core and the metal plate;
   a second engaging portion arranged on the other one of the core and the metal plate to resiliently engage the first engaging portion;
   a stabilizing mechanism for preventing the air bag module from chattering on the steering wheel body, wherein the stabilizing mechanism includes an urging mechanism for urging the metal plate so that at least part of the metal plate abuts against the core, wherein:
   the urging mechanism includes a pressing spring arranged in the metal plate and having a pressing portion;
   the first engaging portion includes a tapered portion having an inclined surface that is pressed by the pressing portion; and
   the inclined surface is formed to increase the pressing force of the pressing spring when the amount of displacement of the air bag module increases in a direction opposite to the direction in which the air bag module is attached to the steering wheel body.

8. The steering wheel according to claim 7, wherein the stabilizing mechanism includes an urging mechanism for urging the metal plate away from the core.

9. The steering wheel according to claim 7, wherein the core includes an annular rim core, a boss core arranged in the center of the rim core, and a plurality of spoke cores connecting the boss core to the rim core, with the urging mechanism urging the metal plate so that at least part of the metal plate abuts against one of the spoke cores.

10. The steering wheel according to claim 7, wherein the pressing spring is a coil spring having a first end defining the pressing portion, a second end holding the metal plate, and a coil wound between the first end and the second end, with the pressing portion being resiliently movable in the winding direction of the coil.

11. The steering wheel according to claim 7, wherein the pressing portion moves in directions in which the pressing spring is compressed and expanded.

12. A steering wheel for incorporating an air bag device, the steering wheel comprising:
   a steering wheel body including a core;
   an air bag module attached to the steering wheel body;
   a metal plate arranged in the air bag module facing towards the core;
   a first engaging portion arranged on one of the core and the metal plate;
   a second engaging portion arranged on the other one of the core and the metal plate to resiliently engage the first engaging portion;
   a lock mechanism including a spring having a pivot shaft pivotally held by the first engaging portion and a movable shaft extending parallel to the pivot shaft and being movable between an initial position and a lock position, wherein:
   the spring is held in a state in which the movable shaft is urged away from the pivot shaft;
   the second engaging portion pivots the movable shaft about the pivot shaft to the lock position to be engaged with the first engaging portion when attaching the air bag module to the core; and
   the second engaging portion pivots the movable shaft about the pivot shaft from the lock position to the initial position to be disengaged from the first engaging portion when an external force separating the movable shaft from the lock position is applied to the movable shaft and the air bag module is moved in a direction in which the air bag module is removed from the core, wherein:

the lock mechanism includes a pair of parallel arms extending perpendicular to the air bag module, each arm having a first notch engaged with the pivot shaft, a second inn engaged with the movable shaft when the movable shaft is located at the initial position, a third notch engaged with the movable shaft when the movable shaft is moved to the lock position from the second notch, and a guide for guiding the movable shaft from the second notch to the third notch; and the core includes a first tongue, a second tongue, and a third tongue located at positions corresponding to the pair of arms, with:

the first tongue disengaging the movable shaft from the second notch and moving the movable shaft to the third notch in cooperation with the guide when pressure is applied to the air bag module to attach the air bag module to the core;

the second tongue fastening the movable shaft when the movable shaft is arranged in the third tongue;

the first and second tongues arranged between the pair of arms when the air bag module is attached to the core;

the movable shaft being disengaged from the third notch by applying external force to the movable shaft with a tool inserted through a hole located near the second tongue; and the third tongue moving the movable shaft from the third notch to the second notch in cooperation with the guide when the external force is applied to the movable shaft to disengage the movable shaft from the third notch and the air bag module is moved in a direction in which the air bag module is removed from the core.

13. The steering wheel according to claim 12, wherein the steering wheel has an upper side that faces towards a driver, and the third notch is located upward from the first notch and the second notch is located downward from the first notch.

14. The steering wheel according to claim 12, wherein the guide includes a curved surface or an inclined surface for guiding the movement of the movable shaft about the pivot shaft.

15. The steering wheel according to claim 12, wherein the first tongue includes a sloped end for disengaging the movable shaft from the second notch and for aiding the movement of the movable shall from the second notch to the third notch.

16. The steering wheel according to claim 12, wherein the second tongue includes an upper surface for aiding the disengagement of the movable shaft from the third notch when the external force resiliently flexes the movable shaft.

* * * * *